United States Patent
Bowen et al.

(10) Patent No.: US 7,398,779 B2
(45) Date of Patent: Jul. 15, 2008

(54) THERMOSIPHONING SYSTEM WITH SIDE MOUNTED STORAGE TANKS

(75) Inventors: Galen Bowen, Chico, CA (US); Robert Bowen, Quincy, CA (US)

(73) Assignee: FAFCO, Incorporated, Chico, CA (US)

( * ) Notice: Subject to any disclaimer, the term of this patent is extended or adjusted under 35 U.S.C. 154(b) by 238 days.

(21) Appl. No.: 11/097,983

(22) Filed: Mar. 31, 2005

(65) Prior Publication Data

US 2006/0219237 A1    Oct. 5, 2006

(51) Int. Cl.
F24J 2/44 (2006.01)
(52) U.S. Cl. .................. 126/639; 126/640; 126/653; 165/175
(58) Field of Classification Search ............ 126/634, 126/638, 639, 640, 643, 652; 165/175
See application file for complete search history.

(56) References Cited

U.S. PATENT DOCUMENTS

| | | | |
|---|---|---|---|
| 3,859,980 A * | 1/1975 | Crawford | 126/624 |
| 3,989,032 A | 11/1976 | Harrison | |
| 4,003,367 A | 1/1977 | Wikholm | |
| 4,026,269 A | 5/1977 | Stelzer | |
| 4,060,070 A * | 11/1977 | Harter | 126/660 |
| 4,088,118 A | 5/1978 | Benseman | |
| 4,089,916 A | 5/1978 | Hay | |
| 4,108,160 A | 8/1978 | Harper | |
| 4,116,225 A | 9/1978 | Ortabasi | |
| 4,140,103 A | 2/1979 | Leigh | |
| 4,153,104 A | 5/1979 | Ruder | |
| 4,159,707 A | 7/1979 | Miquel | |
| 4,169,460 A | 10/1979 | Popovich et al. | |
| 4,172,442 A | 10/1979 | Boblitz | |
| 4,204,522 A * | 5/1980 | Wilson | 126/660 |
| 4,205,662 A | 6/1980 | Rhodes et al. | |
| 4,206,745 A | 6/1980 | Gilgen | |
| 4,219,387 A | 8/1980 | Gruntman | |
| 4,228,789 A | 10/1980 | Kay | |
| 4,237,965 A | 12/1980 | Hay | |
| 4,245,617 A | 1/1981 | Buckley | |
| 4,253,309 A | 3/1981 | Abrahamsson et al. | |
| 4,258,701 A | 3/1981 | Buckley | |

(Continued)

FOREIGN PATENT DOCUMENTS

JP    2001-272112    10/2001

OTHER PUBLICATIONS

"Passive Solar Water Heaters," http://energyoutlet.com/res/waterheat/passive.html, downloaded Dec. 17, 2004.

(Continued)

*Primary Examiner*—Sarah Suereth
(74) *Attorney, Agent, or Firm*—Beyer Law Group LLP

(57) ABSTRACT

An improved thermosiphon solar heater is disclosed. The thermosiphon solar heater includes a substantially planar collector including a plurality of heat exchanger channels that are positioned next to one another in a parallel relationship. The thermosiphoning solar heater also includes a pair of headers fluidly coupled to the collector. A first header is disposed at a top end of the collector. A second header is disposed at a bottom end of the collector. The thermosiphoning solar heater further includes one or more exposed storage tanks fluidly coupled to the header and positioned in a side by side relationship next to the collector.

31 Claims, 19 Drawing Sheets

U.S. PATENT DOCUMENTS

| | | |
|---|---|---|
| 4,280,478 A | 7/1981 | Duval et al. |
| 4,280,556 A | 7/1981 | Cooper |
| 4,287,877 A | 9/1981 | Gaines |
| 4,296,729 A | 10/1981 | Cooper |
| 4,302,942 A | 12/1981 | Charters et al. |
| 4,309,986 A | 1/1982 | Eastman et al. |
| 4,313,419 A | 2/1982 | Lyon et al. |
| 4,317,444 A | 3/1982 | Maruko |
| 4,340,030 A | 7/1982 | Molivadas |
| 4,341,200 A | 7/1982 | Bowen |
| 4,343,293 A | 8/1982 | Thomason et al. |
| 4,353,352 A | 10/1982 | Zinn |
| 4,357,932 A | 11/1982 | Stacy |
| 4,364,239 A | 12/1982 | Chapelle et al. |
| 4,366,807 A | 1/1983 | Barber, Jr. |
| 4,369,629 A | 1/1983 | Lockwood |
| 4,378,789 A | 4/1983 | Vironneau |
| 4,384,568 A | 5/1983 | Palmatier |
| 4,397,294 A | 8/1983 | Mancebo |
| 4,399,807 A | 8/1983 | Buckley et al. |
| 4,404,962 A | 9/1983 | Zinn et al. |
| 4,409,962 A | 10/1983 | Riley |
| 4,413,614 A | 11/1983 | Lyon et al. |
| 4,416,257 A | 11/1983 | Bale |
| 4,421,100 A | 12/1983 | Yu |
| 4,426,999 A | 1/1984 | Evans et al. |
| 4,428,362 A * | 1/1984 | Larkin .................. 126/639 |
| 4,450,868 A | 5/1984 | Duval et al. |
| 4,471,759 A | 9/1984 | Anderson et al. |
| 4,473,066 A | 9/1984 | Clark |
| 4,478,211 A | 10/1984 | Haines et al. |
| 4,479,487 A | 10/1984 | Migdal |
| 4,481,975 A | 11/1984 | Buckley |
| 4,505,261 A | 3/1985 | Hunter |
| 4,505,262 A | 3/1985 | Eaton |
| 4,517,961 A | 5/1985 | Bloor et al. |
| 4,524,757 A | 6/1985 | Buckley |
| 4,531,511 A | 7/1985 | Hochberg |
| 4,535,756 A | 8/1985 | Rinehart et al. |
| 4,541,412 A | 9/1985 | Bagshaw et al. |
| 4,545,364 A | 10/1985 | Maloney |
| 4,546,757 A | 10/1985 | Jakahi |
| 4,573,525 A | 3/1986 | Boyd |
| 4,574,779 A | 3/1986 | Hayes |
| 4,587,952 A | 5/1986 | Richardson |
| 4,599,994 A | 7/1986 | Cole |
| 4,603,685 A | 8/1986 | Jean et al. |
| 4,615,381 A | 10/1986 | Maloney |
| 4,622,951 A | 11/1986 | Matzkanin |
| 4,686,961 A | 8/1987 | Garrison |
| 4,706,650 A | 11/1987 | Matzkanin |
| 4,744,224 A | 5/1988 | Erickson |
| 4,790,477 A | 12/1988 | Forkin et al. |
| 4,911,353 A | 3/1990 | Deakin |
| 4,928,665 A | 5/1990 | Klier et al. |
| 4,930,492 A | 6/1990 | Rich |
| 4,966,014 A | 10/1990 | Erickson |
| 5,014,770 A | 5/1991 | Palmer |
| 5,103,802 A | 4/1992 | Thomason |
| 5,272,891 A | 12/1993 | Erickson |
| 5,281,310 A | 1/1994 | Djelouah et al. |
| 5,404,867 A | 4/1995 | Rich |
| 5,452,710 A | 9/1995 | Palmer |
| 5,537,990 A | 7/1996 | Lee |
| 5,572,988 A | 11/1996 | Walton |
| 5,575,276 A | 11/1996 | Fossum et al. |
| 5,596,981 A * | 1/1997 | Soucy .................. 126/704 |
| 5,646,792 A | 7/1997 | Butler |
| 5,806,511 A | 9/1998 | Hart |
| 5,823,177 A | 10/1998 | Whitehead |
| 5,931,156 A | 8/1999 | Wang et al. |
| 5,960,790 A | 10/1999 | Rich |
| 5,979,548 A | 11/1999 | Rhodes et al. |
| 6,014,968 A | 1/2000 | Teoh |
| 6,024,086 A | 2/2000 | Rich |
| 6,038,768 A | 3/2000 | Rhodes |
| 6,119,682 A | 9/2000 | Hazan |
| 6,158,499 A | 12/2000 | Rhodes et al. |
| 6,391,162 B1 | 5/2002 | Kamiya et al. |
| 6,487,768 B2 * | 12/2002 | Rhodes .................. 29/564.8 |
| 6,581,273 B1 | 6/2003 | Rhodes |
| 6,604,521 B2 | 8/2003 | Smith et al. |
| 6,619,283 B2 | 9/2003 | Ghela |
| 6,648,236 B2 | 11/2003 | Tacchi |
| 6,709,616 B2 | 3/2004 | Rhodes |
| 6,722,358 B2 | 4/2004 | Rhodes |
| 6,837,303 B2 | 1/2005 | Butler |
| 2003/0116154 A1 | 6/2003 | Butler et al. |
| 2003/0159690 A1 | 8/2003 | Butler |
| 2003/0159804 A1 | 8/2003 | Butler |
| 2003/0188423 A1 | 10/2003 | Rhodes |
| 2005/0139344 A1 | 6/2005 | Butler |

OTHER PUBLICATIONS

"Solar Water Heating—Active Systems," http://www.flasolar.com/active_dhw.htm, downloaded Jan. 20, 2005.

"Solar Water Heating—Passive Systems," downloaded Jan. 20, 2005.

"Solar Water Heating—Thermosyphon Systems," http://www.flasolar.com/thermosyphon_systems.htm, downloaded Dec. 17, 2004.

"Promotion of solar water heating systems," http://www.sidsnet.org/successstories//11.html, downloaded Dec. 17, 2004.

"Solar Design Catalog," http://www.aaasolar.com/passive.htm, downloaded Dec. 17, 2004.

"Thermosyphon," http://www.choice-solutions.com/website_files/soft_energy_files/soft_energy_1_b.html, downloaded Dec. 17, 2004.

"Solar Hot Water and Space Heating and Cooling," http://www.eere.energy.gov/FE/solar_hotwater.html, downloaded Jan. 20, 2005.

"Solar Hot Water, Heating and Cooling Systems," http://www.greenbuilder.com/sourcebook/HeatCool.html, downloaded Jan. 20, 2005.

"ProgressivTube Passive Solar Water Heaters," http://www.solardirect.com/swh/pt/pt1/pt1.htm, downloaded Jan. 20, 2005.

"Solar Water Heating," http://www.ucsusa.org/clean_energy/renewable_energy/page.cfm?pageID—1595, downloaded Jan. 20, 2005.

"Solar water heating for pools," http://www.solartwin.com/pools.htm, downloaded Jan. 20, 2005.

"System Description for The Solar Butler 1.0 Solar Hot Water System," Dec. 23, 2002.

"Solar Assisted Hot Water," http://www.butlersunsolutions.com/, downloaded Aug. 4, 2005.

"Save with Solar," technical bulletin, Summer 1998—vol. 1, No. 2.

International Search Report dated Dec. 1, 2006 from corresponding International Application No. PCT/US06/12028.

Written Opinion dated Dec. 1, 2006 from corresponding International Application No. PCT/US06/12028.

"Passive Solar Water Heaters," http://energyoutlet,com/res/waterheat/passive.html, downloaded Dec. 17, 2004.

"Solar Water Heating—Active Systems," http://www.flasolar.com/active_dhw.htm, downloaded Jan. 20, 2005.

"Solar Water Heating—Passive Systems," www.flasolar.com/passive_dhw.htm, downloaded Jan. 20, 2005.

"Solar Water Heating—Thermosyphon Systems," http://www.flasolar.com/thermosyphon_systems.htm, downloaded Dec. 17, 2004.

"Promotion of solar water heating systems," http://www.sidsnet.org/successstories//11.html, downloaded Dec. 17, 2004.

"Solar Design Catalog," http://www.aaasolar.com/passive.htm, downloaded Dec. 17, 2004.

"Thermosyphon," http://www.choice-solutions.com/website_files/soft_energy_1_b.html, downloaded Dec. 17, 2004.

"Solar Hot Water and Space Heating and Cooling," http://www.eere.energy.gov/FE/solar_hotwater.html, downloaded Jan. 20, 2005.

"Solar Hot Water, Heating and Cooling Systems," http://www.greenbuilder.com/sourcebook/HeatCool.html, downloaded Jan. 20, 2005.

"ProgressivTube Passive Solar Water Heaters," http://www.solardirect.com/swh/pt/pt1/pt1.htm, downloaded Jan. 20, 2005.

"Solar Water Heating," http://www.ucusa.org/clean_energy/renewable_energy/page.cfm?pageID=1595, downloaded Jan. 20, 2005.

"Solar water heating for pools," http://www.solartwin.com/pools.htm, downloaded Jan. 20, 2005.

"System Description for The Solar Butler 1.0 Solar Hot Water System," Dec. 23, 2002.

"Solar Assisted Hot Water," http://www.butlersunsolutions.com/, downloaded Aug. 4, 2005.

"Save with Solar," technical bulletin, Summer 1998—vol. 1, No. 2. Solar swimming pool heating system", http://www.solardev.com/pool_plan.php, downloaded Jan. 20, 2005.

\* cited by examiner

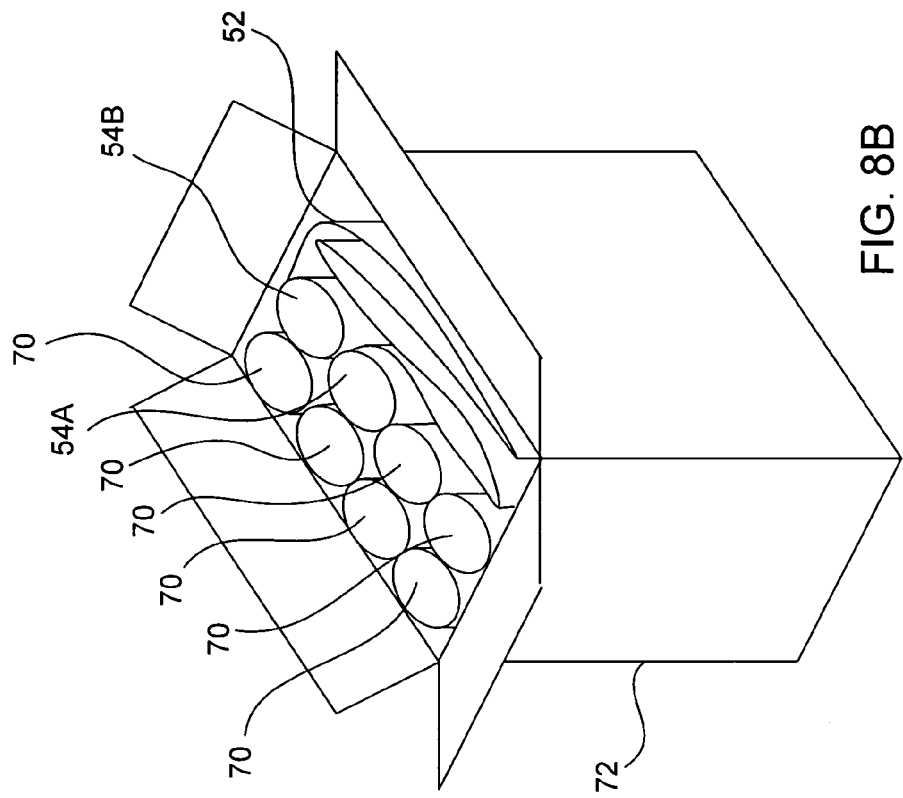
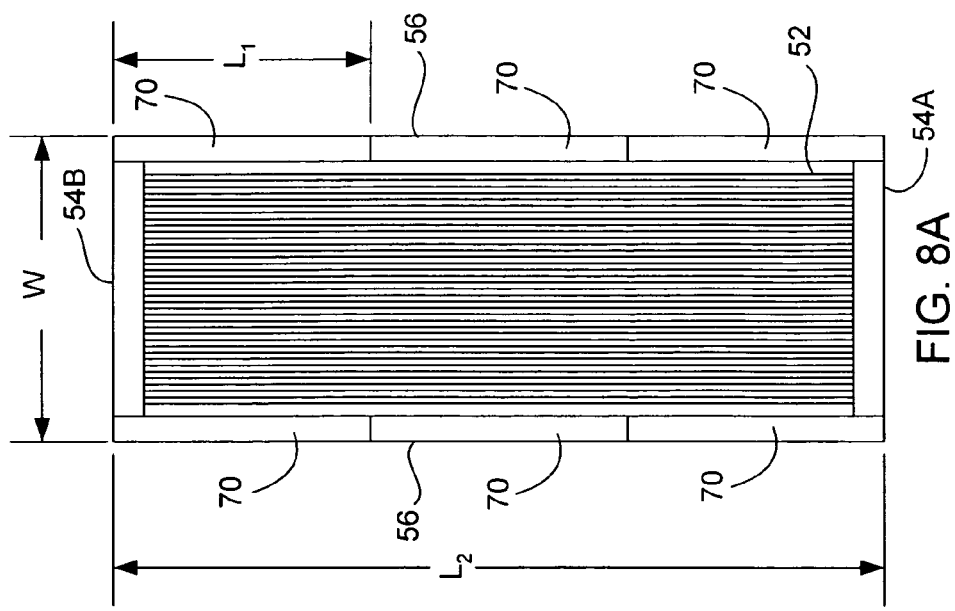
FIG. 8B
FIG. 8A

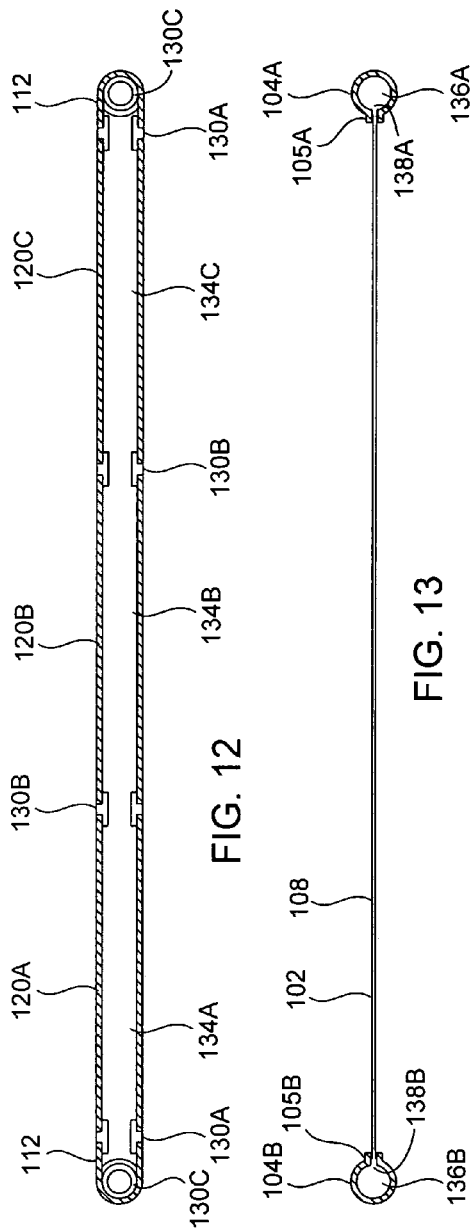
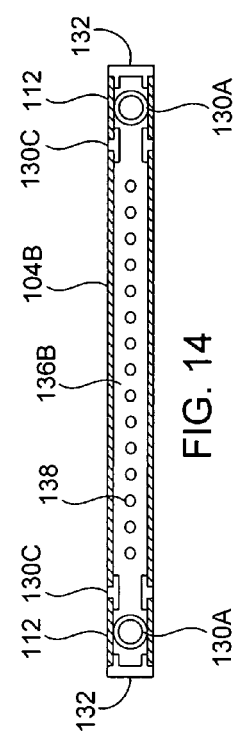
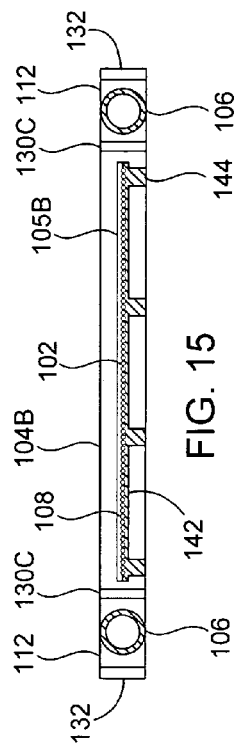
FIG. 12
FIG. 13
FIG. 14
FIG. 15

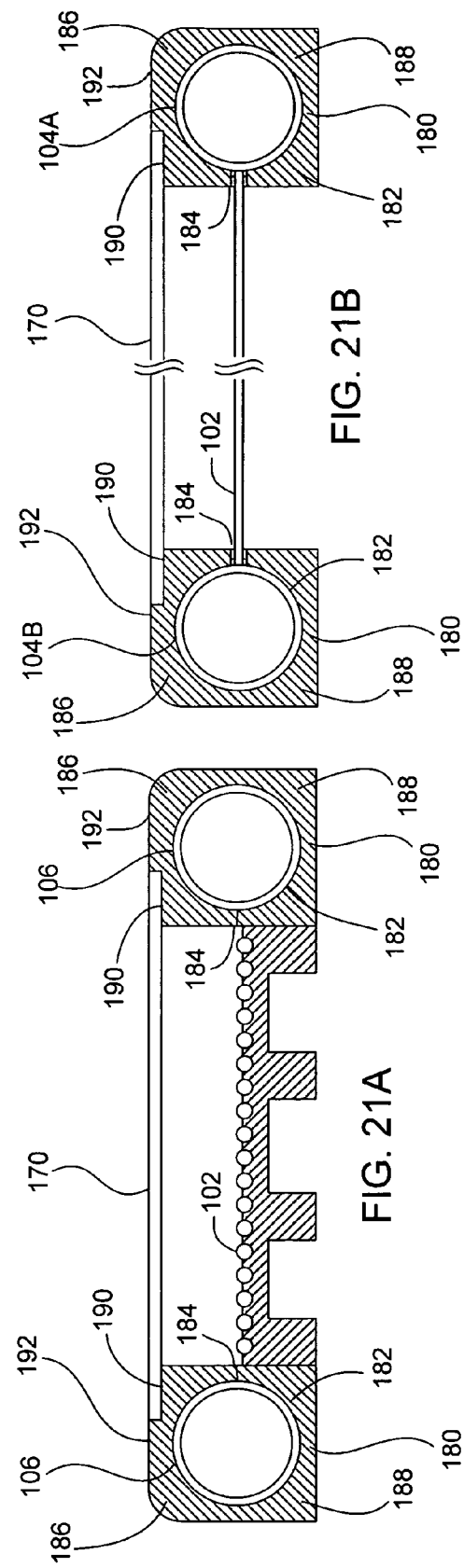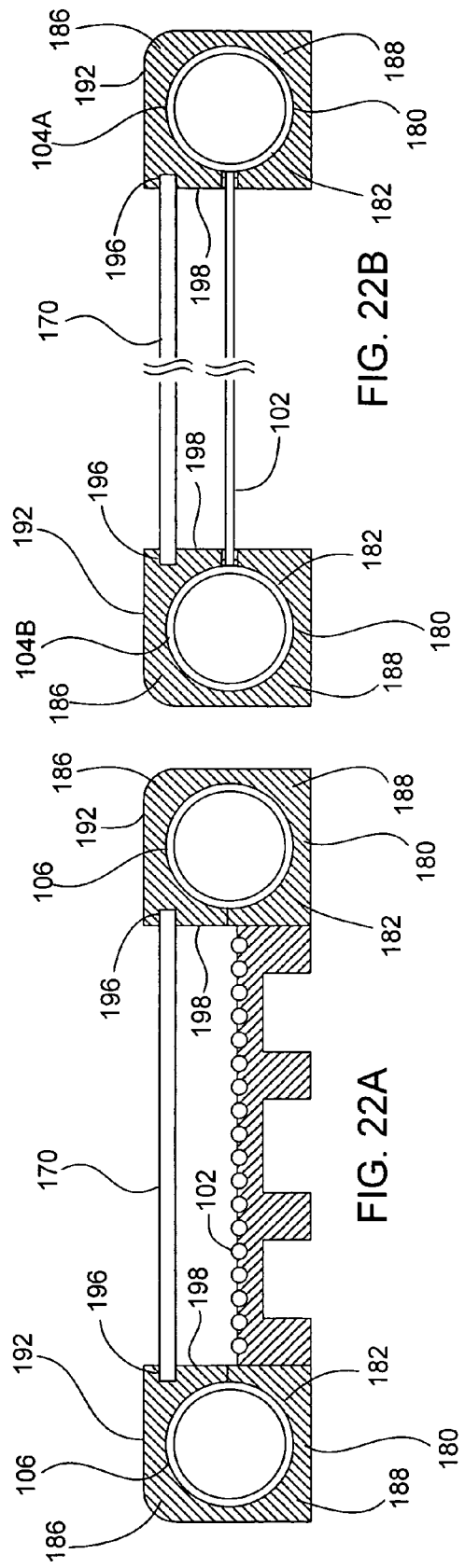

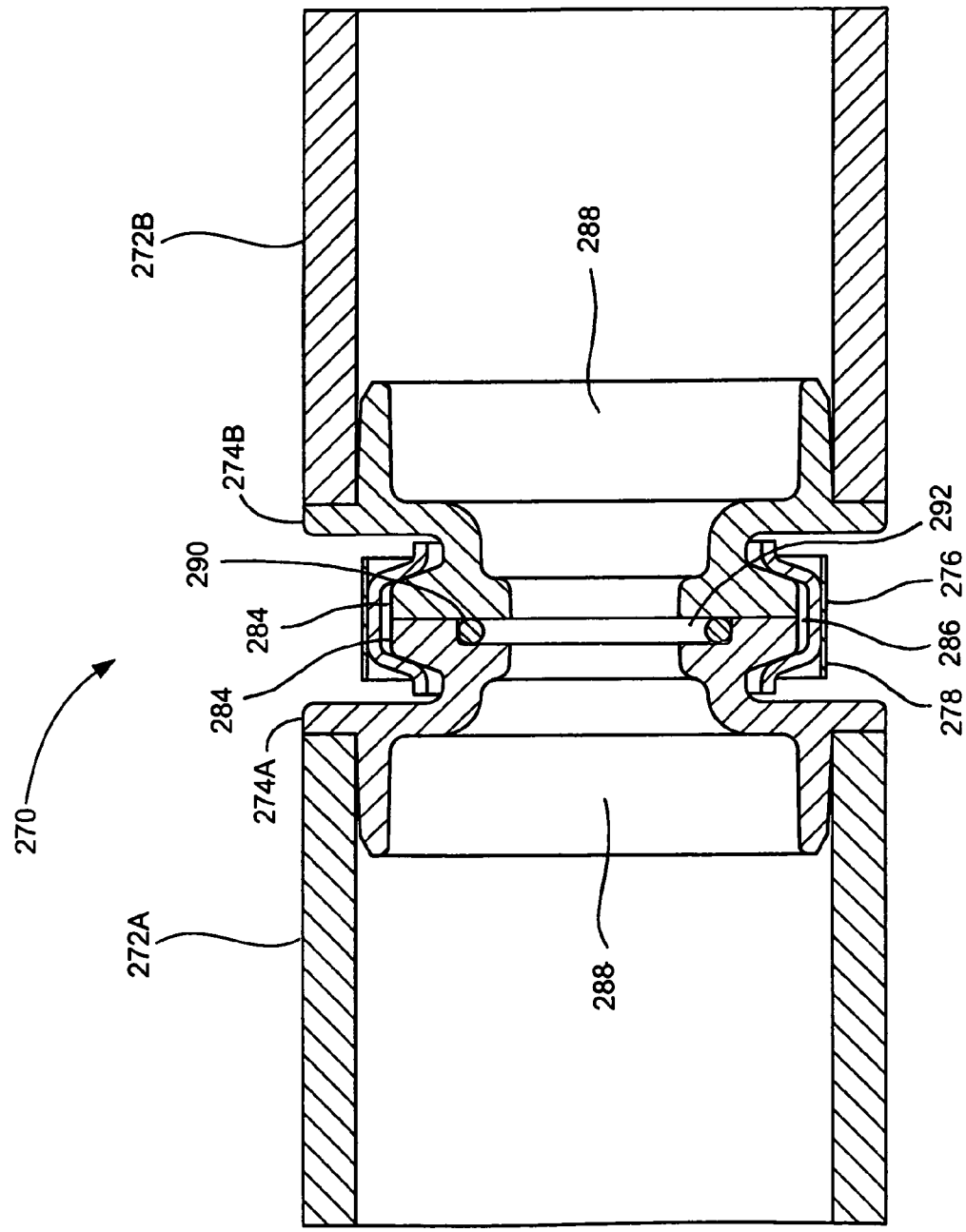

THERMOSIPHONING SYSTEM WITH SIDE MOUNTED STORAGE TANKS

BACKGROUND OF THE INVENTION

1. Field of the Invention

The present invention relates generally to solar heaters. More particularly, the present invention relates to thermosiphoning solar heaters with side mounted storage tanks.

2. Description of the Related Art

Solar heater systems are designed to capture heat from the sun and to store the solar heat until the heat is needed. In solar water heaters, the heat is ultimately transferred to water. Solar water heaters, which typically include a collector and storage tank, come in various forms including both active and passive systems.

In active systems, the collector is typically a flat plate collector, which includes a rectangle box, tubes that extend through the box and a transparent cover that covers the box. The tubes help capture heat and transfer the heat to water inside the tubes. A pump is used to circulate water from a storage tank through the collector and back to the storage tank (typically located in the house). The pump essentially pumps the hot water from the collector into the tank and the colder water out of the tank and into the collector. The pump is typically controlled by a control system that activates the pump when the temperature in the collector is higher than the temperature in the storage tank. The control system may also deactivate the pump when the temperature in the collector is lower than the temperature in the storage tank. In some cases, the storage tank may double as a hot water heater in order to back up the solar heating, i.e., it can heat the water when the temperature of the water in the collector is low. One advantage of active systems is that they provide better control of the system and therefore they can be operated more efficiently than other systems. Furthermore, using the control system, active systems can be configured to protect the collector from freezing in colder climates.

In passive systems, the heated water is moved via natural convection or city water pressure rather than using pumps. Although passive systems are generally less efficient than active systems, the passive approach is simple and economical. Compared to active systems, the passive system does not require controls, pumps, sensors or other mechanical components and therefore it is less expensive to operate and further it requires little or no maintenance over its lifetime. Passive systems come in various forms including batch and thermosiphon systems.

Batch systems such as breadbox solar water heaters or integrated collector storage systems are thought of as the simplest of all conventional solar water heaters. In batch systems, the storage tank is built into or integrated with the collector, i.e., a self contained system that serves as a solar collector and a storage tank. Batch systems typically consist of one or more storage tanks, which are disposed in an insulated enclosure having a transparent cover on one side. The side of the storage tanks facing the transparent cover is generally colored black to better absorb solar energy. Batch systems use water pressure from the city source (or well) to move water through the system. Each time a hot water tap is opened, heated water from the storage tank is delivered directly to the point of use or indirectly through an auxiliary tank (e.g., hot water heater). One advantage of batch systems is that the water does not have to be stored separately from the collector. Furthermore, due to the large mass storage, batch systems typically do not encounter freezing problems in colder climates.

Thermosiphon systems, on the other hand, include a flat plate collector and a separate storage tank. The flat plate collector may be similar to the flat plate collector used in the active system. However, unlike the active system, the storage tank is mounted above the collector to provide natural gravity flow of water, i.e., the heated water rises through the collector to the highest point in the system (e.g., top of storage tank) and the heavier cold water in the storage tank sinks to the lowest point in the system (e.g., bottom of collector) thereby displacing the lighter heated water. Most literature on the subject discusses placing the storage tank at least 18 inches above the collector in order to prevent reverse thermosiphoning at night when the temperatures are cooler.

Referring to FIG. 1, a thermosiphon system 10 will be described in greater detail. The thermosiphon system 10 includes a collector 12 and a storage tank 14 mounted above the collector 12. The collector 12 includes an inlet 16 at its lower end for receiving water from a lower portion of the storage tank 14 and an outlet 18 at its upper end for delivering heated water to an upper portion of the storage tank 14. As the sun shines on the collector 12, the water inside the collector 12 is heated. Due to natural convection, the heated water in the collector starts moving upwards. As it moves upwards, the heated water is moved to the top of the storage tank 14 and the colder water in the bottom of the storage tank 14 is moved to the bottom of the collector 12 thereby replacing the heated water that was moved upwards to the storage tank 14. Furthermore, the storage tank 14 typically includes an inlet 20 at the lower portion of the storage tank 14 and an outlet 22 at an upper portion of the storage tank 14. The inlet receives 20 water directly from a city water source (or well), and the outlet 22 delivers heated water to an auxiliary tank such as a hot water heater or point of use whenever the hot water tap is opened.

Unfortunately, thermosiphon systems such as these suffer from several drawbacks. For one, these systems can freeze in colder climates. The collector typically has low thermal mass especially when compared to the storage tank and therefore the liquid contained therein is susceptible to freezing. Counter measures such as drainage systems and heat exchangers typically must be implemented in order to correct the freezing problem. Unfortunately, these add complexity and cost to the system (which is supposed to be simple and economical). For another, most thermosiphon systems are bulky devices formed from large, awkward and heavy parts and therefore they are difficult to manage and install. This is especially true on roofs and for do it yourselfers with limited support. In some cases, due to the weight of the storage tank when filled, the roof underneath the storage tank must be made more structurally sound (e.g., the load of the storage tank is not evenly distributed). Furthermore, because these systems are large and heavy, the costs of shipping these products are exorbitantly high. In fact, in some cases, the cost of shipping may be higher than the cost of the product itself. Another drawback with thermosiphon systems is that they tend not to be aesthetically pleasing. While the collector typically follows the roof line, the storage tank does not and therefore it sticks out like a sore thumb, i.e., the storage tank protrudes higher than the collector. In some cases, this is the main reason people do not purchase thermosiphon systems.

Based on the foregoing, an improved solar heater and more particularly an improved thermosiphoning system is desired.

SUMMARY OF THE INVENTION

The invention relates in one embodiment to a thermosiphon solar heater. The thermosiphon solar heater includes an exposed substantially planar collector including a plurality of heat exchanger channels that are positioned next to one another in a parallel relationship. The thermosiphoning solar heater also includes a pair of exposed headers fluidly coupled to the collector. A first header is disposed at a top end of the collector. A second header is disposed at a bottom end of the collector. The thermosiphoning solar heater further includes one or more exposed storage tanks fluidly coupled to the header and positioned in a side by side relationship next to the collector.

The invention relates, in another embodiment, to a thermosiphoning solar heater. The thermosiphoning solar heater includes a flexible collector including a plurality of small diameter plastic tubes that are positioned side by side and held together with one or more clips. The thermosiphoning solar heater also includes a pair of rigid headers formed from large diameter plastic pipe. The headers are fluidly coupled and integrally formed with the tubes of the collector to form a single unified piece. A first header is perpendicularly positioned at a top end of the collector. A second header is perpendicularly positioned at a bottom end of the collector. The thermosiphoning solar heater further includes at least a first pair of rigid storage tanks formed from large diameter plastic pipe and in fluid communication with the headers. The storage tanks are positioned next to and parallel with the collector. A first storage tank is positioned on a first side of the collector. A second storage tank is positioned on a second side of the collector.

BRIEF DESCRIPTION OF THE DRAWINGS

The invention may best be understood by reference to the following description taken in conjunction with the accompanying drawings in which:

FIG. 8A is a diagram of an assembled collapsible solar heater, in accordance with one embodiment of the present invention.

FIG. 8B is a diagram of an unassembled collapsible solar heater, in accordance with one embodiment of the present invention.

FIG. 12 is a side view, in cross section, of the solar heater shown in FIG. 11A, in accordance with one embodiment of the present invention.

FIG. 13 is a side view, in cross section, of the solar heater shown in FIG. 11A, in accordance with one embodiment of the present invention.

FIG. 14 is a side view, in cross section, of the solar heater shown in FIG. 11A, in accordance with one embodiment of the present invention.

FIG. 15 is a side view, in cross section, of the solar heater shown in FIG. 11A, in accordance with one embodiment of the present invention.

FIG. 21A is a side view, in cross section, of a solar heater including an insulating member, in accordance with one embodiment of the present invention.

FIG. 21B is a side view, in cross section, of a solar heater including an insulating member, in accordance with one embodiment of the present invention.

FIG. 22A is a side view, in cross section, of a solar heater including an insulating member, in accordance with one embodiment of the present invention.

FIG. 22B is a side view, in cross section, of a solar heater including an insulating member, in accordance with one embodiment of the present invention.

FIG. 27B is a side elevation view, in cross section, of a coupler arrangement, in accordance with one embodiment of the present invention.

DETAILED DESCRIPTION OF THE INVENTION

Figure 1:
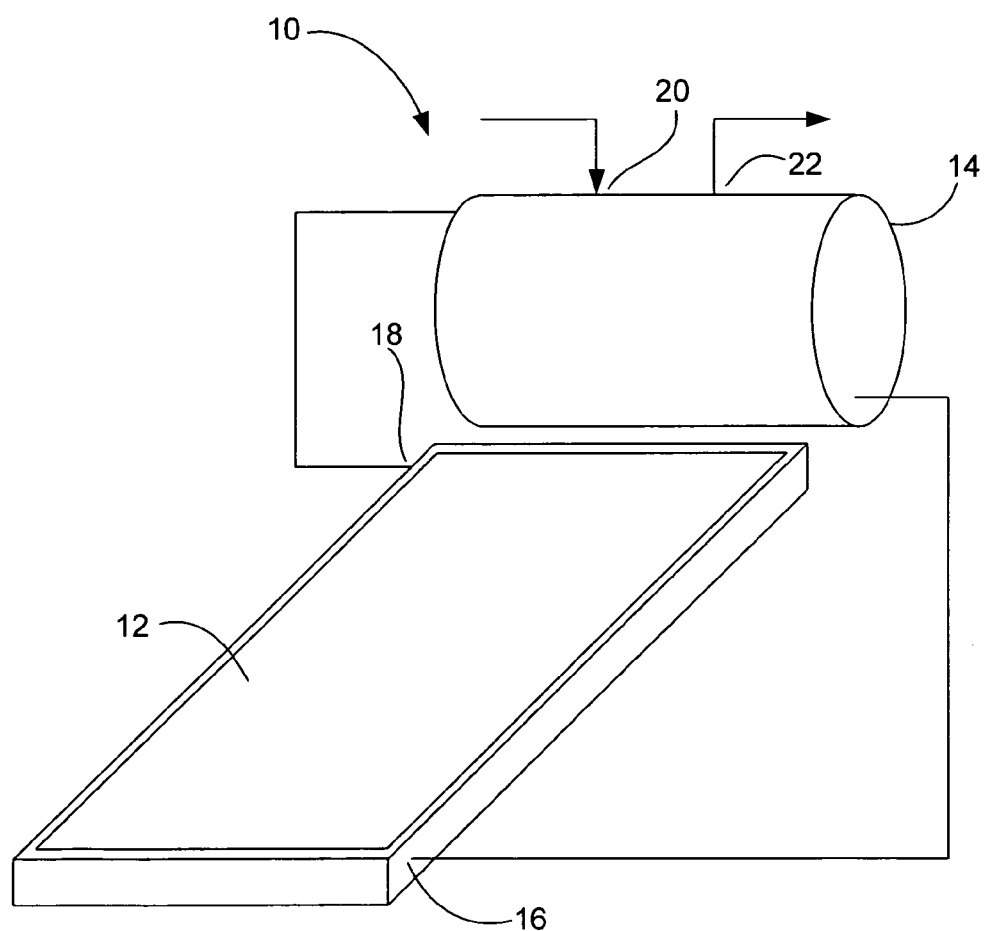
FIG. 1 is a diagram of a conventional thermosiphon system.

Most people skilled in the art believe that placing the storage tank above the collector is the only way to operate thermosiphoning systems. In fact, most people skilled in the art think that it is a critical to place the storage tank at least 18 inches above the collector to prevent reverse thermosiphing at night. This is reiterated throughout the solar literature. In contrast to this belief, the present invention proposes placing one or more storage tanks next to the collector rather than on top of the collector (e.g., side by side). By placing the storage tanks next to the collector, the system is capable of both forward and reverse thermosiphoning, i.e., the system forward thermosiphons when the water is being heated in the collector (during the day when the sun is shining) and reverse thermosiphons when the water is being cooled in the collector (at night when the sun is no longer shining).

One advantage having a system that reverse thermosiphons is that the collector mitigates freezing problems at night, i.e., the flow of the water cycles backwards causing warmer water to be introduced into the collector. This prevents the water from freezing in the collector. As a result, conventional anti-freezing techniques that increase the complexity and cost of the solar water heater are substantially eliminated. By way of example, the reverse thermosiphoning system may eliminate the need for drainage and heat exchanger mechanisms.

Further, because the storage tanks are side mounted, the storage tanks are capable of serving as structural components that help support the various components of the heater in their assembled position as well as to support the heater on a surface such as a roof. In essence, the side mounted storage tanks serve the same function as a container box and therefore the need for a container box is substantially eliminated. One advantage of eliminating the container box is that the entire system can be installed with simplicity and ease. Another advantage is that the system is much easier to ship.

Furthermore, because the side mounted storage tanks distribute the load longitudinally, the load applied to the roof tends to be more evenly distributed when the storage tank is filled with water. In addition to that, the profile of the storage tanks can be reduced thereby improving the aesthetic appearance of the solar water heater. In fact, the storage tanks can be configured to have a continuous upper surface that follows or is parallel to the roof line thereby minimizing its visual impact, i.e., the storage tanks no longer protrude out of the roof.

In some cases, the storage tanks may even collapse into smaller components in order to make the storage tanks more manageable during shipping and installation. For example, the system can be configured to fit inside one or more standard shipping boxes thereby drastically reducing shipping costs.

In addition, the entire system may be formed from modular components so that the system can be configured in a variety of ways. For example, in contrast to most systems that are designed for one particular use, the system of the present invention can be configured for different user loads.

Embodiments of the invention are discussed below with reference to FIGS. 2-27. However, those skilled in the art will readily appreciate that the detailed description given herein with respect to these figures is for explanatory purposes as the invention extends beyond these limited embodiments.

Figure 2:
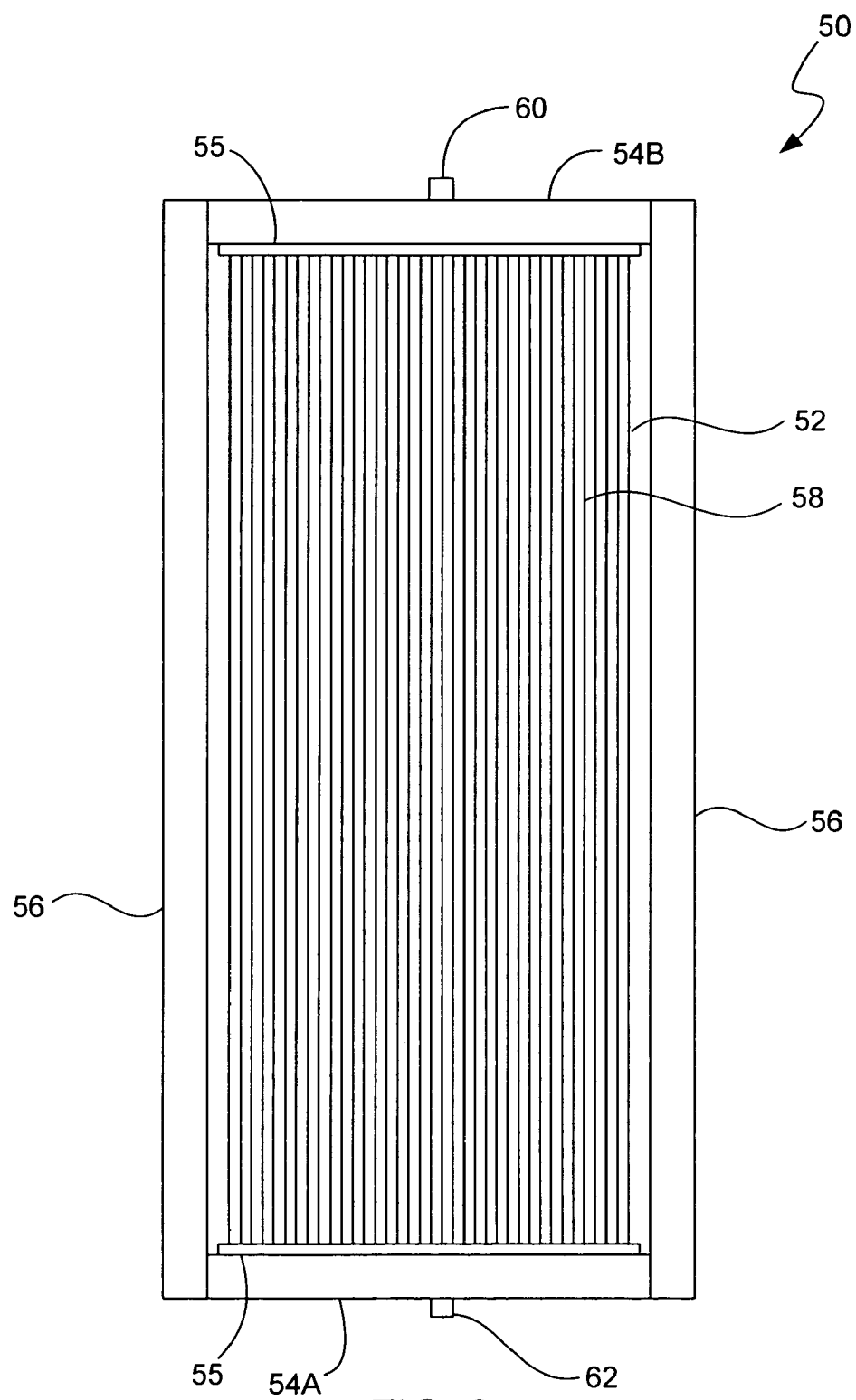
FIG. 2 is a diagram of a solar heater, in accordance with one embodiment of the present invention.

FIG. 2 is a diagram of a solar heater 50, in accordance with one embodiment of the present invention. The solar heater 50 may for example be mounted on a roof in order to supply domestic hot water to a home. Although the system can be designed as a point of use system, the system is typically designed to supplement an existing hot water heater. That is, the system is configured to deliver hot water to the tank of the hot water heater and from there the hot water can be distributed to a point of use as for example when a hot water tap is opened.

As shown, the solar heater 50 includes a collector 52, a pair of headers 54 and one or more storage tanks 56. The collector 52 is fluidly coupled to the headers 54 and the headers 54 are fluidly coupled to the storage tanks 56. A fluid such as water is therefore capable of circulating in any direction (forward, reverse) through the solar heater 50. In most cases, the length of the heater is typically larger than the width in order to allow stratification of the fluid from top to bottom of the system. By way of example, the solar heater may have an aspect ratio of about 3:1.

The collector 52 is configured to capture solar heat from the sun and to transfer the solar heat to a fluid inside the collector 52. During the daytime, the sun heats up the surface of the collector 52, and the walls pass this heat to the fluid contained inside the collector 52. In most cases, the collector 52 is formed from a dark color such as black so as to absorb a greater amount of the sun's energy. As shown, the collector 52 includes one or more individual channels or conduits 58 that act as passageways for moving the fluid between the pair of headers 54. The channels 58 are typically positioned together in a parallel relationship to form a single collector panel.

The channels 58 may be integrally formed with one another to form a single piece (e.g., molded or welded) or they may be separate and distinct parts that are bundled together mechanically (e.g., clips). The channels 58 may for example take the form of small tubes or pipes, which can be formed from rigid and/or flexible materials such as metals and/or plastics. When plastic, the channels may be formed from individual tubes that are either clipped or welded together or alternatively the channels may be formed by seam welding two sheets together or by molding a single sheet with a plurality of tubes. In one particular embodiment, the tubes 58 of the collector 52 are formed from a flexible material such as plastic so as to provide a catenary in the collector 52 that helps accommodate differential thermal expansion between the collector 52 and the side mounted storage tanks 56.

The bottom header 54A, which provides minimal storage, is configured to receive and temporarily hold incoming cold water as for example from a city source or from a well. The top header 54B, which also provides minimal storage, is configured to temporarily hold and help deliver outgoing hot water as for example to an auxiliary tank or a point of use. It should be pointed out that although the headers 54 may be considered part of the overall storage system, most of the storage capacity is in the storage tanks 56.

The headers 54, which are positioned at opposite ends of the collector 52, tend to be parallel with one another and substantially perpendicular to the collector 52 (as shown). The bottom header 54A fluidly couples to the bottom end of the collector 52 and the top header 54B fluidly couples to the top end of the collector 52. Fluids may therefore pass between the headers 54 and the collector 52 (in either direction).

The collector 52 may be integrally formed with the headers 54 (e.g., molded or welded) or it may be a separate piece of equipment that connects or couples to the headers 54 (e.g., couplings or fittings). In either case, the headers 54 may include a manifold 55, which fluidly receives the channels 58 of the collector 52, and which helps distribute the fluid between the collector 52 and the headers 54. The headers 54 may for example take the form of a large tube or pipe, which can be formed from rigid and/or flexible materials such as metals and/or plastics. Although not a requirement, the headers and collectors are typically formed from the same materials or from materials with similar properties. When both components are formed from plastic, the tubes of the collector tend to be flexible while the header pipes tend to be rigid (due to their wall thickness). Furthermore, the tubes of the collector may be welded or fused onto the header pipes as described in U.S. Pat. No. 6,038,768, which is herein incorporated by reference.

The storage tanks 56, which are configured to store large fluid volumes, are positioned next to the collector 52 in a side-by-side relationship. As a result of this orientation, the storage tanks 56 tend to be substantially parallel with the collector 52 and substantially perpendicular to the headers 54. As shown, the upper end of the storage tank 56 fluidly couples to the edge of the top header 54B and the lower end of the storage tank 56 fluidly couples to the edge of the bottom header 54A. In some cases, the storage tanks 56 are coupled to the sides of the headers 54 and in other cases, the storage tanks 56 are coupled to the ends of the headers 54 (as shown). In either case, the storage tanks 56 may be integrally connected with the headers 54 (e.g., glued, molded or welded) or they may be mechanically connected or coupled to the headers 54 (e.g., fittings or couplings).

Moreover, like the headers 54, the storage tanks 56 may take the form of a large tube or pipe, which can be formed from rigid and/or flexible materials such as fabrics, rubbers, metals and/or plastics. By way of example, the storage tanks may be formed from fire hoses, rubber hoses, metal pipe, plastic pipe and the like. The storage tanks may have cross sectional dimensions that are the same or larger than the headers. The size of both the header and storage tanks generally depends on the needs and limitations of the system.

In one particular arrangement, the collector 52 is formed from individual plastic tubes 58 that are flexible and held together with one or more clips. In addition, the headers 54 and storage tanks 56 are formed from round plastic pipes that are rigid and have a similar cross section in both shape and size. The ends of the flexible plastic tubes 58 are welded or fused with the headers 54 to form a single unified piece. The storage tanks 56, on the other hand, are separate pieces that are mechanically attached to the headers 54 rather than being integrally formed therewith. The storage tanks 56 may for example be coupled to the headers 54 using seals, couplings, or fittings and thereafter secured to these components using clamps. In fact, in some cases, elbow joints or T joints may be used to help connect the storage tanks 56 to the headers 54. It should be pointed out that by being flexible, the collector is capable of deforming at a different rate than the storage tank and header. As a result, stresses are substantially reduced.

Because the collector 52 is fluidly coupled to the headers 54 and because the headers 54 are fluidly coupled to the storage tanks 56, fluids stored therein can flow in a clockwise or counterclockwise manner through the system 50. In fact, due to natural convection, the system 50 is capable of both forward and reverse thermosiphoning. During forward thermosiphoning, the heated fluid inside the collector 52 is moved from the collector 52 to the storage tank 56 and the colder fluid in the storage tank 56 is moved from the storage tank 56 to the collector 52. During reverse thermosiphoning, the warmer fluid inside the storage tank 56 is moved from the storage tank 56 to the collector 52, and the colder fluid in the collector 52 is moved from the collector 52 to the storage tank.

Figure 3B:
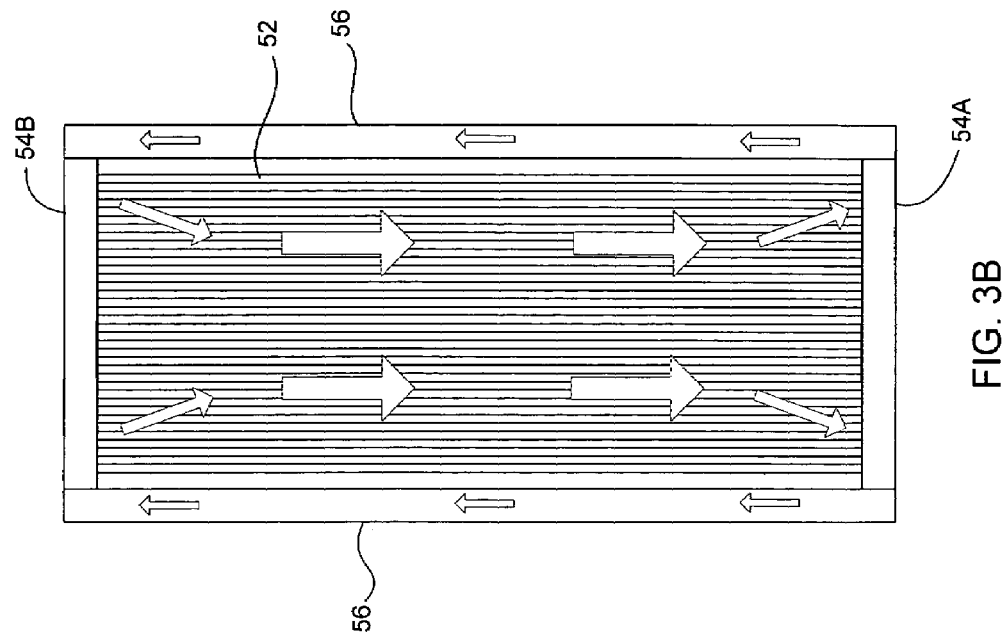
FIG. 3B is a diagram illustrating a reverse thermosiphoning circuit, in accordance with one embodiment of the present invention.
Figure 3A:
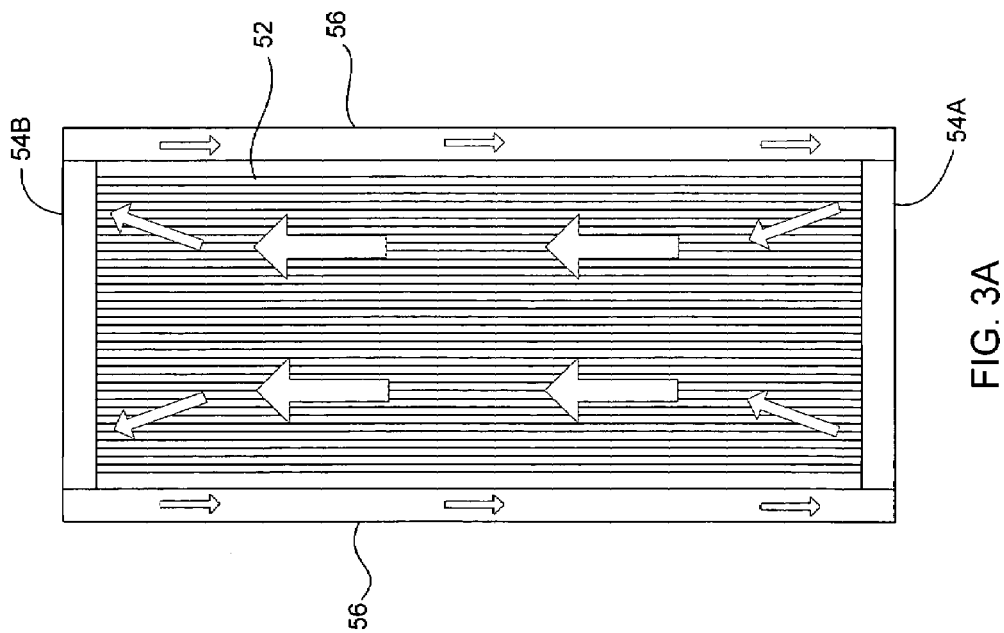
FIG. 3A is a diagram illustrating a forward thermosiphoning circuit, in accordance with one embodiment of the present invention.

FIG. 3A is a diagram illustrating a forward thermosiphoning circuit. As shown by the arrows, the fluid flows through the collector 52 into the top header 54B, from the top header 54B into the storage tank 56, from the storage tank 56 into the bottom header 54A, and from the bottom header 54A into the collector 52. More particularly, as the fluid inside the collector 52 heats up (during the day when the sun is shining thereon), the fluid expands slightly and becomes lighter than the colder water in the rest of the system 50. Because of gravity, the heavier cold water in the storage tank 56 is forced into the bottom header 54A and thereafter into the collector 52. The cold water displaces the heated fluid and pushes the heated fluid through the collector 52 and into top header 54B. As long as the collector 52 is heated and no draws are being taken, the fluid is continuously cycled in this manner.

FIG. 3B is a diagram illustrating a reverse thermosiphoning circuit. The reverse thermosiphoning circuit operates in a direction opposite to the forward thermosiphoning circuit mentioned above. As shown by the arrows, the fluid flows from the top header 54B into the collector 52, from the collector 52 into the bottom header 54A, from the bottom header 54A into the storage tank 56, and from the storage tank 56 into the top header 54B. More particularly, as the fluid in the collector 52 cools down (during the night when the sun no longer shines on the collector), the fluid inside the collector 52 and the bottom header 54A becomes heavier than the fluid inside the storage tank 56. The heavier cold water in the collector 52 and bottom header 54A is pulled into the storage tank 56 and the lighter hot water in the storage tank 56 and top header 54B is pulled into the collector 52. As long as the collector 52 is cooled and no draws are being taken, the fluid is continuously cycled in the reverse direction.

Put another way, because the thermal mass is higher in the storage tank 56, the thermal losses in the collector 52 will occur at a faster rate during the night when the sun is no longer shining. As the water in the collector 52 cools down (the collector operates as an emitter rather than a collector), the colder water tends to fall due to gravity. When it falls, it pushes the warm water in the storage tank 56 up into the header 54B and down through the top of the collector 52. As a result of distributing warm fluid into the tubes of the collector, freezing in the tubes of the collector is substantially reduced.

In some cases, a valve or other device may be used to limit the extent of the reverse thermosiphoning.

Referring back to FIG. 2, other features of the solar heater 50 will now be described. As shown, the top header 54B includes an outlet 60 for outputting heated fluid from the solar heater 50. The heated fluid may be delivered directly to a point of use or indirectly through an auxiliary heater such as a hot water heater (e.g., gas, electric). In addition, the bottom header 54A includes an inlet 62 for receiving fluid that is cooler than the heated fluid. It is generally believed that delivering colder water as for example from the main rather than from a heated source helps jump start the forward thermosiphoning circuit. The inlet 62 may for example be coupled to a city water main that delivers water at about 60° F. Although, the inlet 62 and outlets 60 are shown at the center of the headers 54, it should be noted that this is not limitation and that they may be placed at any point along the top of the solar heater 50 including the sides of the headers 54 or even at locations on the storage tanks 56.

Furthermore, not only does the storage tank 56 and header 54 provide fluid storage, but they also form a rigid frame of the solar heater 50. That is, the headers 54 and storage tanks 56 are not just storage elements but also structural elements that can be mounted to a roof and that can serve as a platform for supporting various components of the solar heater 50 including for example glazings. This particular set up eliminates the need for a standard box, which adds complexity and cost to the system (e.g., produces a box less solar heater).

The solar heater 50 may be used in both active and passive systems. In passive systems, when a draw is being taken from the solar heater 50, as for example when a hot water tap is opened, the hot fluid stored in the top header 54B and storage tanks 56 are forced out the outlet 60 directly to the hot water tap or indirectly to an auxiliary tank via the pressure of the incoming fluid. In active systems, when a draw is being taken from the solar heater 50, as for example when the hot water tap is opened, the hot fluid in the top header 54B is pumped through the outlet 60 to the tap or to an auxiliary tank via a pump and control system. In both systems, when a draw is not being taken (tap is closed), the fluid in the solar heater 50 cycles through the solar heater 50 via forward or reverse thermosiphoning. It should be pointed out that in some cases storage tanks may not be required in active systems.

Although two storage tanks are shown, it should be noted that this is not a limitation and that fewer or more storage tanks may be used. The number is typically determined by the capacity needs of the drawing system. In some cases, it may be desirable to only include a single tank on only one side of the collector while in other cases it may be desirable to provide multiple tanks on both sides of the collector (rather than just one). The distribution of storage tanks may be symmetrical (equal number on both sides) or asymmetrical (disparate number of storage tanks on each side). It should also be pointed out that more than one collector may be used. Like the storage tanks, the number is dependent on the needs of the drawing system. In cases where multiple collectors are used, the storage tanks may be positioned on the outside of all the collectors and/or they may be located between two collectors.

In accordance with one embodiment of the invention, the solar water heater shown in FIG. 2 is a configurable system. By configurable, it is meant that the system includes basic modular components that can be assembled in a variety of ways. The basic modular components can be the collector 52, headers 54, storage tanks 56, and/or they can be components thereof (e.g., smaller segments of the larger components). In some cases, the modular components may even be larger components such as an integral collector/header that is one piece. The basic modular components come in standard shapes and sizes, with standard threads, fittings or couplings, that can easily be plugged into one another with little effort and possibly no tools to form different systems. The system can therefore be designed to more closely match the actual needs of the drawing system as well as to better fit within the design constraints of the environment in which the solar heater is used.

Conventional systems typically only address the needs of one type of user. In contrast, the system 50 described herein can be customized to fit the needs of many users. The system 50 is configured to allow the user to customize the collector to storage ratio, which influences the response time of the system. If the ratio of storage to collector is high (more storage, less collector), the user will receive a lot of hot water at the end of the day. If the ratio of storage to collector is low (more collector, less storage), the user will receive small portions of hot water throughout the day. As should be appreciated, more collector area generally means that the systems response is quicker and hotter, but there tends not to be a lot of water stored. Because of the simplicity of the design, the customization can be performed during installation, i.e., add a storage tank if a high storage to collector ratio is needed, add a collector if a low storage to collector ratio is needed, etc.

FIGS. 4-7 show several examples of different configurations that can be made using the standard components of the base system described in FIG. 2.

Figure 4:
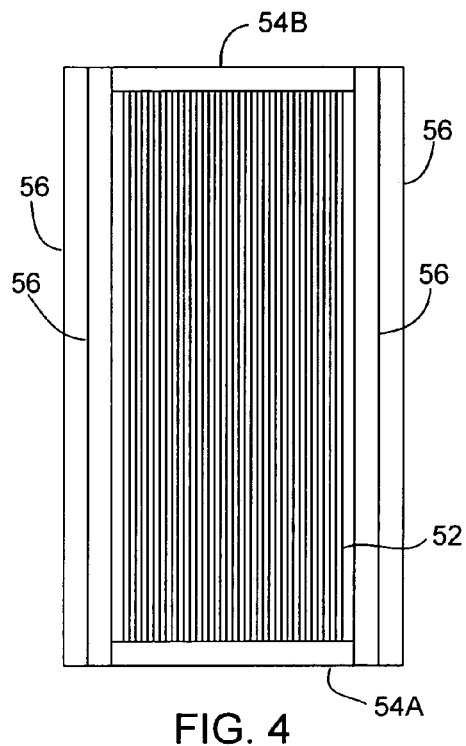
FIG. 4 is a diagram of a solar heater, in accordance with one embodiment of the present invention.

As shown in FIG. 4, additional storage tanks 56 have been added to the sides of the base system 50. In particular, the system 50 now includes a pair of storage tanks 56 on both sides of the collector 52. The amount of storage is therefore doubled.

Figure 5:
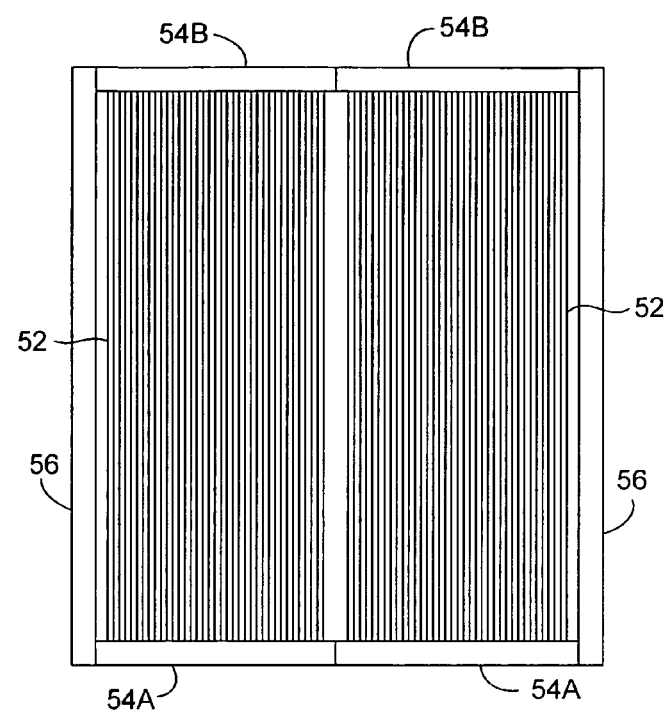
FIG. 5 is a diagram of a solar heater, in accordance with one embodiment of the present invention.

As shown in FIG. 5, additional collectors 52 have been added to the base system 50. In particular, the system 50 now includes a pair of collectors 52 disposed between two side storage tanks 56. The amount of collection is therefore doubled.

Figure 6:
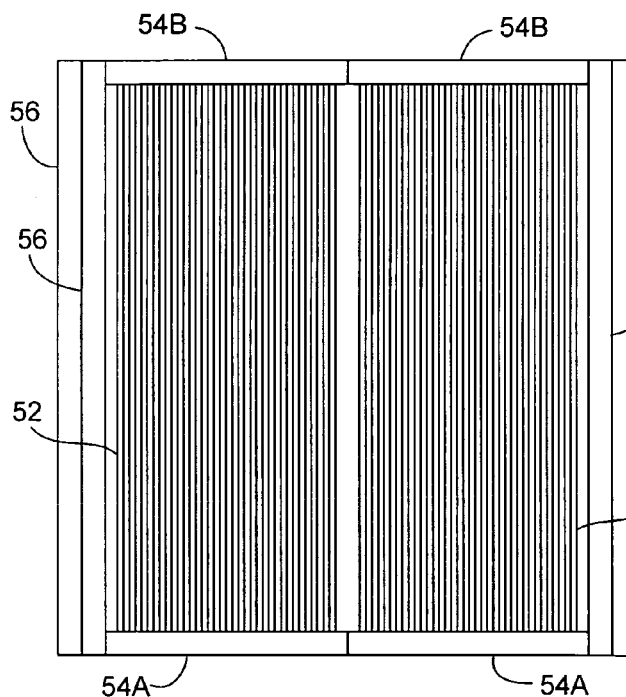
FIG. 6 is a diagram of a solar heater, in accordance with one embodiment of the present invention.

As shown in FIG. 6, additional collectors 52 and additional storage tanks 56 have been added to the base system 50. The system 50 now includes two collectors 52 that are surrounded by four storage tanks 56 (two on each side). The amount of collection and storage is therefore doubled. This system 50 can be further modified by placing one or more storage tanks 56 between the two collectors 52.

Figure 7:
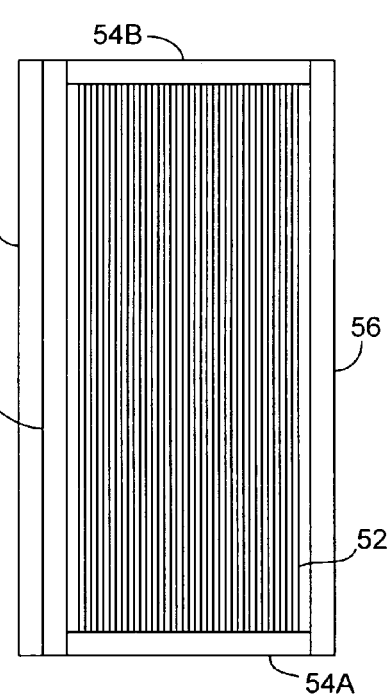
FIG. 7 is a diagram of a solar heater, in accordance with one embodiment of the present invention.

It should be pointed out that while the system 50 is typically set up in a symmetrical manner (as shown in FIGS. 2-6), it is not a requirement. In some cases, it may be desirable to configure a system in an asymmetrical manner. For example, as shown in FIG. 7, the base system 50 may include a greater number of storage tanks 56 on one side of the collector 52. In the illustrated embodiment, one side of the collector 52 includes a pair of storage tanks while the other side of the collector 52 includes a single storage tank 56.

It should be also pointed out that the arrangements in FIGS. 2-7 are shown by way of example and not by way of limitation. For example, additional storage tanks and collectors may be added to any of these systems, or storage tanks and collectors may be subtracted from any of these systems to produce different systems for different needs. It is generally believed that the minimum requirement is one collector/header and one side mounted storage tank. The upper limit, however, has not such requirement except in conjunction with the design constraints (e.g., space available on a roof).

In one embodiment, each storage tank has the capacity to store 6.5 gallons, and each header has the capacity to store 2 gallons. As such, the base system is capable of storing 13 gallons in the storage tanks and 4 gallons in the headers for a total of 17 gallons. If more storage is needed, additional storage tanks can be added. For example, the system shown in FIG. 4, which includes two additional tanks, provides 30 total gallons of storage.

In accordance with another embodiment of the invention, the solar heater 50 shown in FIG. 2 can be configured to be collapsible. By collapsible it is meant that the solar heater 50 can be broken down into smaller components. During installation, the smaller components are assembled together to produce the desired storage tank configuration. The smaller components may for example be assembled together via welds, seals, fittings or couplings. During storage or shipping, the unassembled smaller parts nest with one another thereby saving space. The smaller components are preferably sized and dimensioned so that they are easy to handle and so that they can fit into a standard shipping box.

By making the parts easy to handle, the solar heater 50 is highly portable and easier to assemble, especially for do it yourselfers who are often by themselves (which makes wielding larger parts more difficult). Furthermore, by designing the parts to fit into a standard shipping box, the cost associated with shipping the entire solar heater 50 is substantially reduced (in some cases by a factor of 4). As should be appreciated, if the parts are too large, the parts may have to be shipped in very large boxes or alternatively placed in crates, which are very expensive to ship. In one embodiment, the parts are designed to fit into one or more boxes having a maximum dimension of 59 inches×18 inches×18 inches.

FIGS. 8A and 8B show one embodiment of a collapsible solar heater 50, in accordance with one embodiment of the present invention. In this embodiment, the solar heater 50 includes a collector 52, headers 54, and storage tanks 56 similar to the embodiment shown in FIG. 2. However, unlike FIG. 2, at least some of the components are collapsible. In particular, the storage tanks 56 are segmented into a plurality of sub storage tanks 70 that are snapped or plugged into one another and thereafter glued, welded or clamped in order to secure the connection. Any number of sub storage tanks 70 may be used, however, the general size and dimension should be less than largest dimension of the standard shipping box so that it can fit therein (see FIG. 8B). The length L1 of the sub storage tanks 70 should also be a multiple of the length L2 of the header/collector 52/54 so that the lengths coincide when the system 50 is fully assembled (see FIG. 8A). Furthermore, the width W of the collector/header 52/54 should be less than largest dimension of the standard shipping box so that it can fit therein.

As shown in FIG. 8B, the entire system 50 is collapsible into one or more shipping boxes 72. During packaging, the sub storage tanks 70 are stacked next to each other, while the flexible collector/header 52/54 is rolled up (or folded) and placed between the sub storage tanks 70 and the walls of the box 72. The other parts for connecting the sub storage tanks 70 together as well for connecting the storage tanks 56 to the headers 54 may be bagged and placed into the remaining space inside the box 72. Thereafter, the box 52 may be sealed and sent via standard shipping for a cost, which is dramatically less than what would have otherwise been required to ship the much larger components.

Although a single box is shown, it should be noted that multiple boxes may be used while still keeping the costs low. Several standard shipping boxes still costs less than one large box that is very expensive to ship.

In accordance with another embodiment, the solar heater 50 shown in FIG. 2 may be formed as a low profile system (e.g., flat plate), which is more aesthetically pleasing. The storage tanks 56 do not protrude high above the roof line and they substantially follow the roof line (e.g., parallel). Because the storage tanks 56 are placed on the sides, and because they are elongated, the storage tanks 56 are capable of storing large amounts of fluid for small cross sectional dimensions (which decreases the profile of the solar heater 50). Furthermore, additional storage tanks can be added if more storage is needed as mentioned in FIGS. 4-7 above with out affecting the profile.

Figure 9:
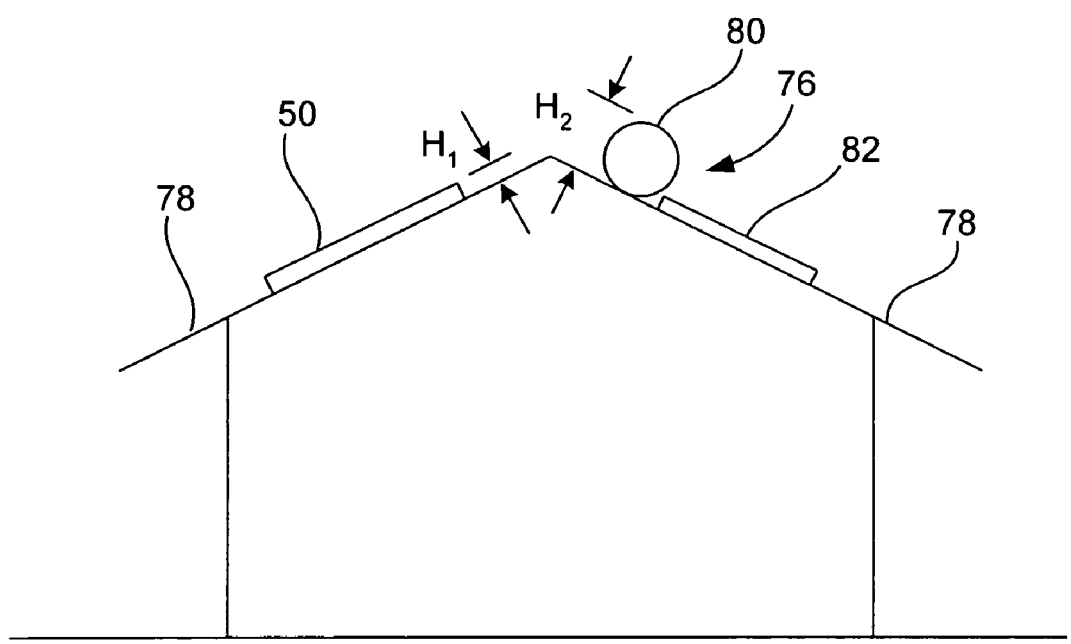
FIG. 9 is a simplified elevation view of low profile solar heater, in accordance with one embodiment of the present invention.

As shown in FIG. 9, the solar heater 50 of the present invention can be designed with a sitting height H1 of less than about 6 inches, which is much smaller than the height H2 of a conventional thermosiphoning system 76 that includes an upper mounted tank 80. Furthermore, the system 50 provides uniform continuous upper surfaces that follow the roof line 78 (e.g., substantially parallel) unlike the conventional thermosiphoning systems 76 that include a large storage tank 80 that protrudes above the collector 82.

Figure 10:
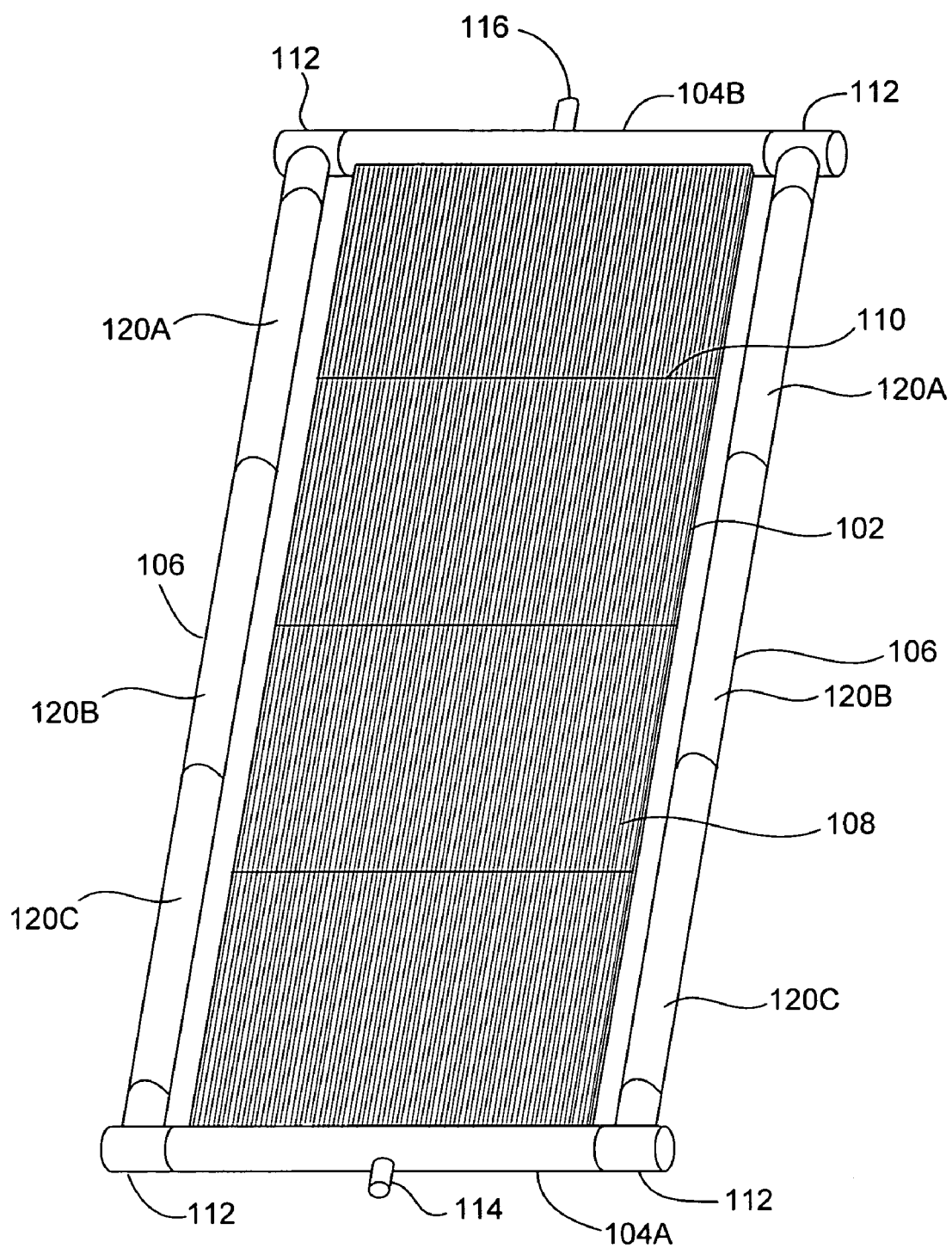
FIG. 10 is a perspective diagram of a solar heater, in accordance with one embodiment of the present invention.
Figure 11:
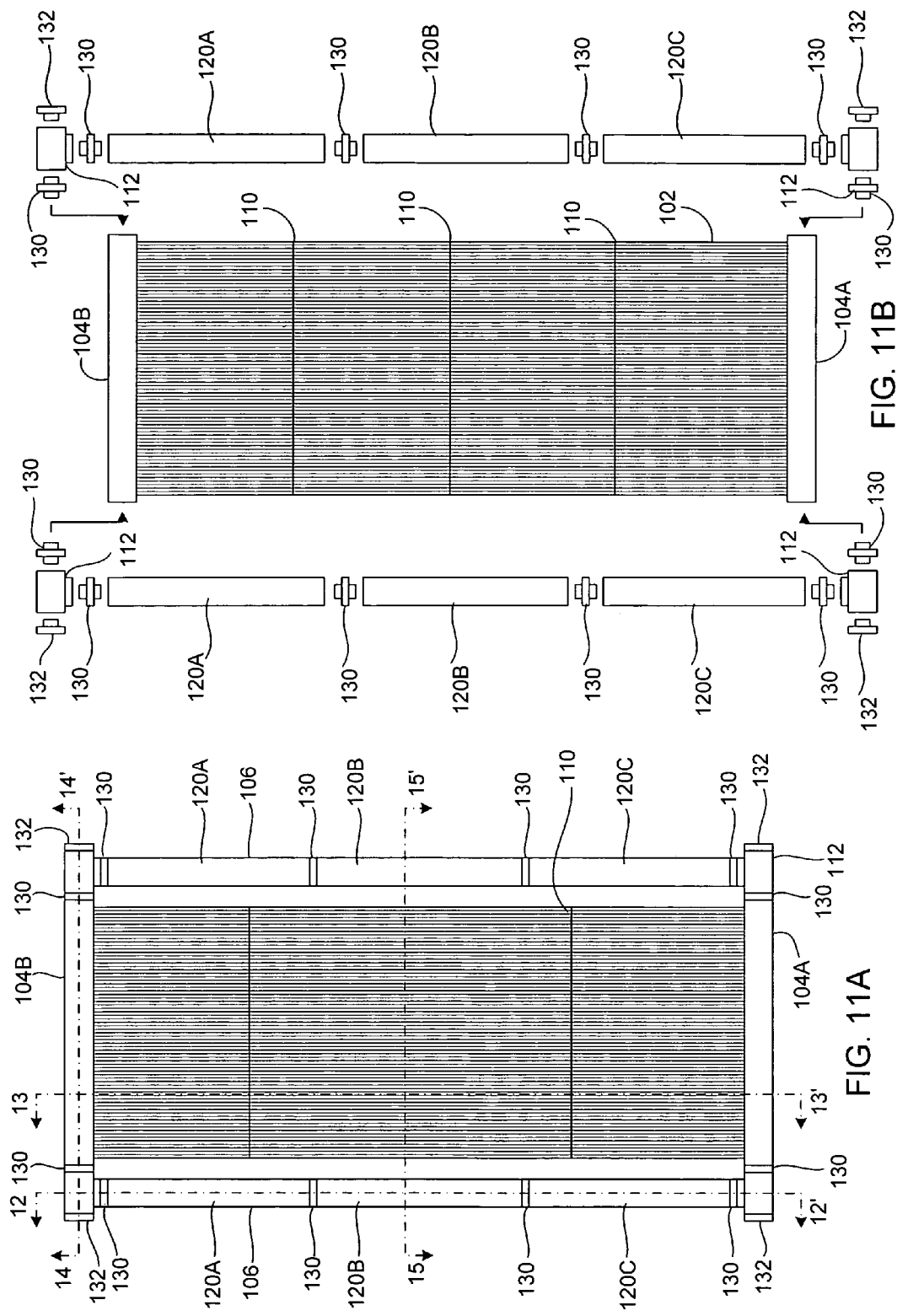
FIG. 11A is a front elevation view of an assembled solar heater, in accordance with one embodiment of the present invention.
FIG. 11B is an exploded front elevation view of a disassembled solar heater, in accordance with one embodiment of the present invention.
Figure 16:
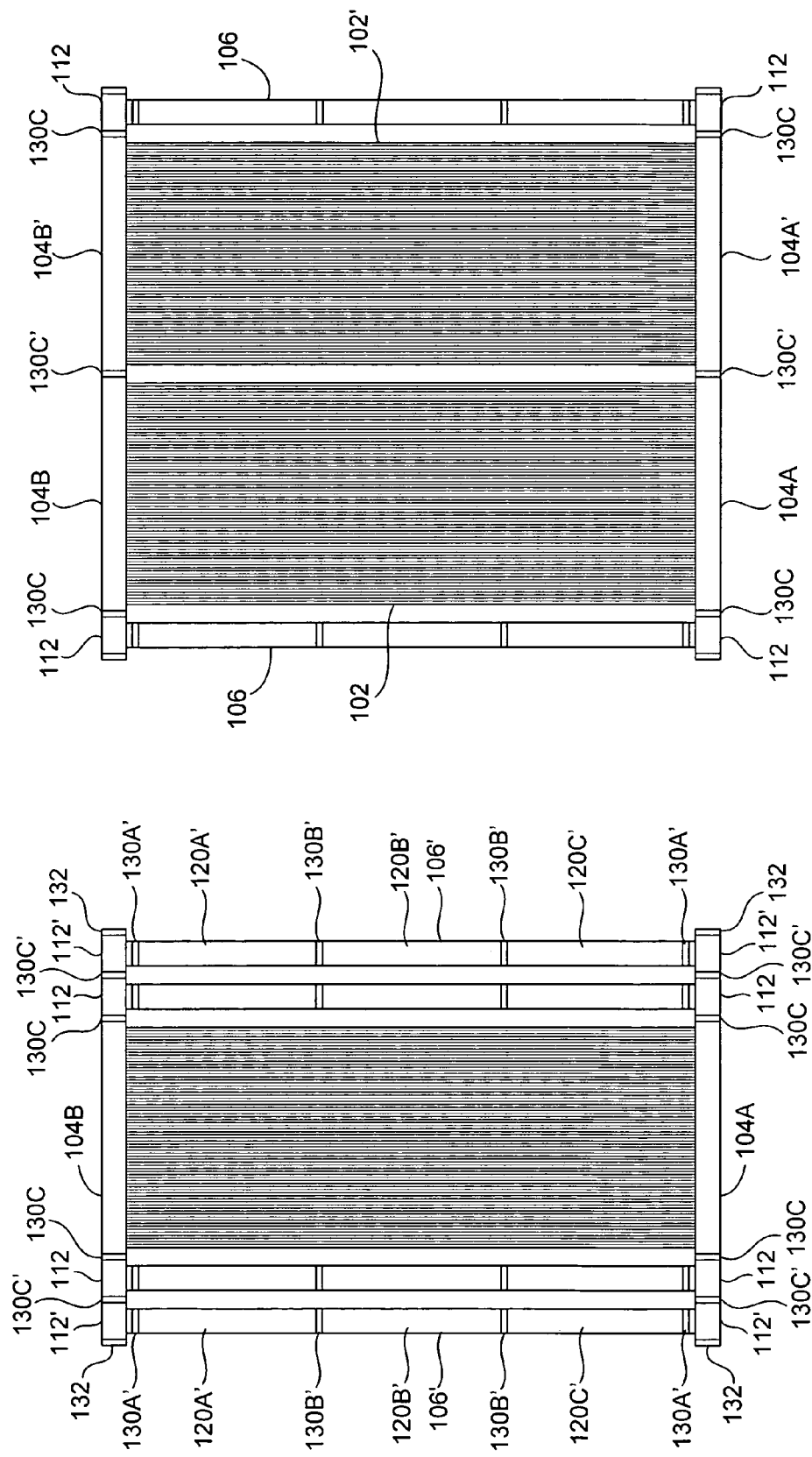
FIG. 16A is a diagram of an expanded solar heater, in accordance with one embodiment of the present invention.
FIG. 16B is a diagram of an expanded solar heater, in accordance with one embodiment of the present invention.

FIG. 10 is a perspective diagram of a solar heater 100, in accordance with one embodiment of the present invention. Like the solar heaters mentioned above, the solar heater 100 includes a collector 102, an upper and lower header 104, and one or more storage tanks 106.

The collector 102 includes a plurality of small diameter plastic tubes 108 that are positioned side by side and that are held together using one or more clips 110. The clips 110 are positioned at different points along the length of the tubes 108 and help maintain the proper spacing between adjacent tubes 108 (as close as possible without overlapping). By way of example, the clips 110 may include a tube separator strip that keeps the tubes in place (parallel and in line) and one or more legs or posts that rest on the surface of the roof thereby keeping the collector 102 separated and substantially parallel with the surface of the roof. Clips 110 may be preferred over welding or integrally formed tubes in that the tubes are allowed to thermally expand without adversely effecting the other tubes. As should be appreciated, the collector may warp due to differences in thermal expansion of the tubes and internal stresses caused by welding. Clips also may provide small gaps between the tubes that allow some venting. Clips suitable for use may be found in U.S. Pat. No. 6,487,768, which is herein incorporated by reference.

The headers 104 are formed from large diameter plastic pipes (larger diameter than the tubes) that are perpendicularly positioned at the ends of the tubes 108. The length of the header pipes 104 are generally larger than the overall width of the collector 102 thereby exposing the ends of the header pipes 104. In most cases, the header pipes 104 are fluidly coupled and integrally formed with the tubes 108 thereby forming a single unified piece. For example, the tubes 108 may be welded or fused to the headers 104. Although this is not a requirement, the connection between the collector 102 and headers 104 is typically accomplished during manufacturing of the components rather than during assembly of the solar heater 100. Techniques for fusing parts similar to these may be found in U.S. Pat. Nos.: 4,098,331 and 6,038,768, both of which are herein incorporated by reference.

The lower header 104A is typically positioned lower than the upper header 104B. For example, when positioned on the roof, the lower header 104A is located closer to the edge of the roof while the upper header 104B is located closer to the peak of the roof. The lower header 104A therefore includes an inlet 114 for receiving incoming fluid that is cold and the upper header 104B includes an outlet 116 for delivering fluid that is heated in the solar heater 100. The position of the inlet and outlet may be widely varied. For example, they can be positioned towards the side of the headers 104 or in the middle of the headers 104 (as shown). Alternatively, they can be placed on the storage tank 106. In passive systems, the inlet 114 is fluidly coupled to a water main or well, and the outlet 116 is fluidly coupled to the point of use or an auxiliary tank such as a hot water heater. In active systems, both the inlet 114 and outlet 116 are fluidly coupled to the hot water heater. The colder fluid inside the hot water heater is pumped to the lower header 104A, and the hotter fluid inside the upper header 104B is pumped to the hot water heater.

Like the headers 104, the storage tanks 106 are formed from larger diameter plastic pipes. In some cases, the diameter of the storage tank pipes 106 may be the same as the header pipes 104 or in other cases, the diameter of the storage tank pipes 106 may be larger than the header pipes 104. The size of the storage tank pipes generally depends on the specific needs of the system as well as handling and shipping constraints of the system. Unlike the headers, however, the storage tanks 106 are placed next to and parallel with the collector 102. As a result, the storage tanks 106 are substantially perpendicular with the headers 104.

As shown, the storage tanks 106 include a plurality of storage segments 120A-C that couple together to form the storage tank 106. Any number of segments may be used, however, in the illustrated embodiment, the storage tank 106 includes three pipe segments 120A, 120B and 120C. By being segmented, the storage tank 106 can be broken down into smaller units. This tends to make assembly easier especially for do it yourselfers, and more particularly do it yourselfers that are by themselves. Furthermore, the smaller components are easier and less expensive to ship. That is, the components can be packed in a smaller box that costs less to ship.

In order to couple the headers 104 to the storage tanks 106, joints 112, such as T joints or elbow joints, are disposed between the ends of the headers 104 and the storage tanks 106. The joints may be formed integrally with the storage tank (upper and lower segments) or the header, or alternatively the joints may be formed as separate pieces that are connected to both the header and the storage tank. Either way, the joints are considered part of the storage tank.

The joints 112 allow fluid communication between the headers 104 and the storage tanks 106, which are perpendicularly placed relative to the headers 104. In the illustrated embodiment, T joints are used. T joints as opposed to elbow joints further allow expandability of the system 100 so that it can be configured for different uses and needs. For example, additional storage tanks 106 using another T joint or additional headers and thus collectors may be coupled to the end of the illustrated T joint in order to produce different systems. Once the desired system is produced, the ends of the T joint are capped thus forming an elbow joint, i.e., the outer joint is an elbow joint. Alternatively, an elbow joint may be used at the junctions located at the outer ends of the system. It should be emphasized that in contrast to other solar systems, this system can be easily expanded years after the original system has been installed.

The connection points between the segments 120, between the segments 120 and the T joints 112, and between the headers 104 and the T joints 112 may be widely varied. In some cases, the headers 104 and segments 120 are sized for insertion into the ends of the T joint 112 (or vice versa). In cases such as these, the various components may be glued, soldered or welded together. In other cases, the headers 104, T joints 112 and segments 120 are attached using couplers such as face seals that can be attached with a mechanical clamping means such as threads, hose clamps, quick release clamps, or alternatively with glue, solder or welds. The welds may be performed by platen welding or alternatively with couplers that include embedded resistance heaters that hook up to a power source such as a 12 volt battery in order to weld the coupler in place. The connections between the header 104, T joints 112 and segments 120 are typically accomplished during assembly of the heater rather than during the manufacture of the components. Because of this, the connections are typically selected to reduce the number of tools required (e.g., tool-less or one tool such as a screw driver or wrench).

Referring to FIGS. 11-15, a detailed embodiment of the solar heater 100 will be described in greater detail. FIG. 11A shows the system fully assembled while FIG. 11B is an exploded view showing the system disassembled. Furthermore, FIGS. 12-15 are various cross sectional views of the assembled system of FIG. 11A.

As shown in FIGS. 11A and 11B, the collector 102 and headers 104A and 104B form a single integral unit while the remaining pieces including the T joints 112 and storage segments 120 are separate and thus have to be assembled together. In the illustrated embodiment, the separate pieces are connected using couplers 130 that are inserted or plugged into the various components. The couplers 130 typically include a first flange portion that is inserted into the opening of a first component (e.g., header) and a second flange portion that is inserted into the opening of a second component (e.g., T joint). The couplers 130 additionally include a clamping mechanism for securing the flange portions within the openings and a seal such as an o-ring for sealing the interface. Releasable clamps are typically preferred so that the system can be easily broken down (as for example if the user decides to move the system or expand the system).

The couplers 130 are disposed between the ends of the header 104 and the T joints 112, between the T joints 112 and the storage segments 120 and between all of the storage segments 120. Furthermore, in order to contain the fluid inside the heater, the outermost T joint 112 is plugged with a cap 132. The cap 132 may be permanently attached using glues or welds or temporally attached using threads. Releasable caps are typically preferred so that the system can be easily expanded (add more storage tanks and/or collectors as the needs of the system changes). Alternatively, elbow joints may be used instead of a capped T joint. Once the system is assembled, the collector 102, headers 104, and storage tanks 106 are in fluid communication with one another. The fluids can therefore move in a forward and reverse direction through the system thereby allowing forward thermosiphoning during the day and reverse thermosiphoning during the night.

As shown in FIG. 12 (which is a cross section taken substantially along 12-12' in FIG. 11A), the storage segments 120A, 120B and 120C, each include a holding chamber (or tube section) 134 that stores fluid and that allows the passage of fluid therethrough from one end to the opposite end. The upper and lower storage segments 120A and 120C of the storage tank 106 are fluidly coupled to the T joints 112 via couplers 130A that are inserted into openings in both the storage segments 120A and 120C and the T joint 112. In addition, the middle storage segment 120B is fluidly coupled to the upper and lower storage segments 120A and 120C via couplers 130B that are inserted into openings in the various ends of the storage segments 120. Moreover, the headers (not shown) are fluidly coupled to the T joints 112 via couplers 130C that are inserted into the openings in both the header and the T joint 112. In all of these cases, the couplers 130 include a first flange portion that is inserted into the opening of a first component and a second flange portion that is inserted into the opening of a second component. The couplers 130 also include a passageway for allowing fluid communication between the components when they are inserted inside the openings. Although not shown, O-rings may be provided to seal the interface between the couplings 130 and the various components (segments, joints, headers).

As shown in FIG. 13 (which is a cross section taken substantially along 13-13' in FIG. 11A), the collector 102, which includes a plurality of tubes 108, is attached to the upper and lower header 104 via a manifold 105 that is integrally formed with the headers 104. The manifold 105 forms a recess within which the ends of the tubes 108 are disposed. In most cases, the tube ends are attached to the manifold 105 via welding so as to produce a permanent integrated structure consisting of the headers 104 and the collector 102. Inside the recess are one or more openings 138 that fluidly connect the recess and thus the tubes 108 to a holding chamber 136 of the headers 104. The holding chamber 136 represents the area within which the fluid is held until a draw is taken. The opening 138 may be one continuous opening that extends the length of the collector 102, or it may be segmented openings placed at various points along the length of the collector 102.

As shown in FIG. 14 (which is a cross section taken substantially along 14-14' in FIG. 11A), the headers 104 each include a holding chamber 136 that stores fluid and that allows the passage of fluid therethrough from one end to the opposite end. The header 104 also includes a plurality of holes 138 that fluidly connect the chamber 136 to the tubes 108 of the collector 102. In one particular implementation, 15 holes are used. The ends of the header 104 are fluidly coupled to the T joints 112 via couplers 130C that are inserted into openings in both the header 104 and the T joint 112. In addition, the storage segments (not shown) are fluidly coupled to the T joints 112 via couplers 130A that are inserted into opening in the T joint 112. Moreover, because the T joint 112 is the outermost joint, a plug 132 is disposed in the outer end of the passage in order to close off the T joint 112.

As shown in FIG. 15 (which is a cross section taken substantially along 15-154' in FIG. 11A), the collector 102 comprises a plurality of tubes 108 that are parallel and positioned side by side juxtaposed). Each of the tubes 108 includes a passage therethrough for passing a fluid between the headers 104. In this particular embodiment, the tubes are individual tubes 108 that are distinct from one another. Although distinct, the tubes 108 are held together with clips 110. The clips 110 include an elongated member 140 that spans the width of the collector 102 and that contains a plurality of recesses 142 (one for each tube) for receiving and holding the tubes 110 therein. The recesses 142 may for example be C shaped so that the tubes 108 can be pressed or snapped into and thereafter held in the recess 142. In some cases, the clips 110 may additionally include spacers 144 that keep the collector 102 from sagging onto the supporting surface (e.g., roof). The spacers 144 act as legs that contact the roof and provide a gap between the roof and the tubes 108 of the collector 102. Furthermore, the storage tanks 106 are substantially parallel and positioned next to the collector 102 (e.g., juxtaposed).

As mentioned above, the components of the solar heater 100 may be formed from plastic materials. Plastic parts are low cost and easy to manufacture. Furthermore, they are lightweight when compared to traditional thermosiphon systems that include glass and metal parts. By way of example, the system can be configured to be less than 60 lbs, which is ⅓ the weight of a conventional flat plate collector that includes glass and copper pipes. By decreasing the weight of the system, the system is much easier to assemble and install on a roof.

Unfortunately, because of the high heats associated with collectors, plastic parts have the tendency to creep over time. As such, the components of the system are formed from highly creep resistant plastic materials. The components may for example be formed from a family of plastics known as polyolefin's. Polyolefin's include for example polybutylene, polyethylene, polypropylene and polypropylene random copolymer (PPR). In one particular embodiment, polypropylene random copolymer (PPR) is used since it has been found to work particularly well in the aforementioned system.

Although the size of the system can vary, in one particular embodiment, the width of the base system is about 4 ft., and the length of the base system is about 12 ft. Furthermore, the size of the components themselves may vary. In determining the diameter of the storage tanks for example, one has to consider that when the diameter is increased to store more water, the thickness of the walls typically has to be increased as well. Unfortunately, increasing the thickness increases both the weight and cost of the storage tank. As result, there is typically a balance that must be made between the amount of storage and the weight and cost of the storage tank. In one particular embodiment, the diameter of the headers and storage tanks are about 3.5 in. OD, and the diameter of the tubes are between about ⅛ in OD to about ¼ in OD, and more particularly about ⅛ in OD. Furthermore, the length of the header is about 4.5 ft, and the length of the storage tanks are about 12 ft. The length of each storage segment may be less than or equal to about 4 ft.

FIGS. 16A and 16B show two examples of how the base system 100 shown in FIGS. 11-15 can be expanded or configured differently. As shown in FIG. 16A, an additional storage tank 106' has been placed on each side of the base system 100. The additional storage tanks 106' are assembled similarly to the previously described storage tanks 106 and therefore include storage segments 120A'-120C' that are coupled together via additional couplers 130B'. The upper and lower storage segments 120A' and 120C' are coupled to additional T joints 112' via additional couplers 130A', and the additional T joints 112' are coupled to the T joints 112 of the base system 100 via additional couplers 130C'. Furthermore, the cap 132 has been removed from the T joint 112 of the base system 100, and placed at the end of the new T joints 112'. As shown in FIG. 16B, an additional collector 102' has been placed between the side mounted storage tanks 106 of the base system 100. The new headers 104A' and 104B' are coupled to the headers 104A and 104B of the base system 100 via couplers 130C', and the T joint 112 of the base system 100 is coupled to the new headers 104A' and 104B' via the existing couplers 130C.

Several embodiments describing additional components and features of the solar heater 100 will now be described.

Figure 17:
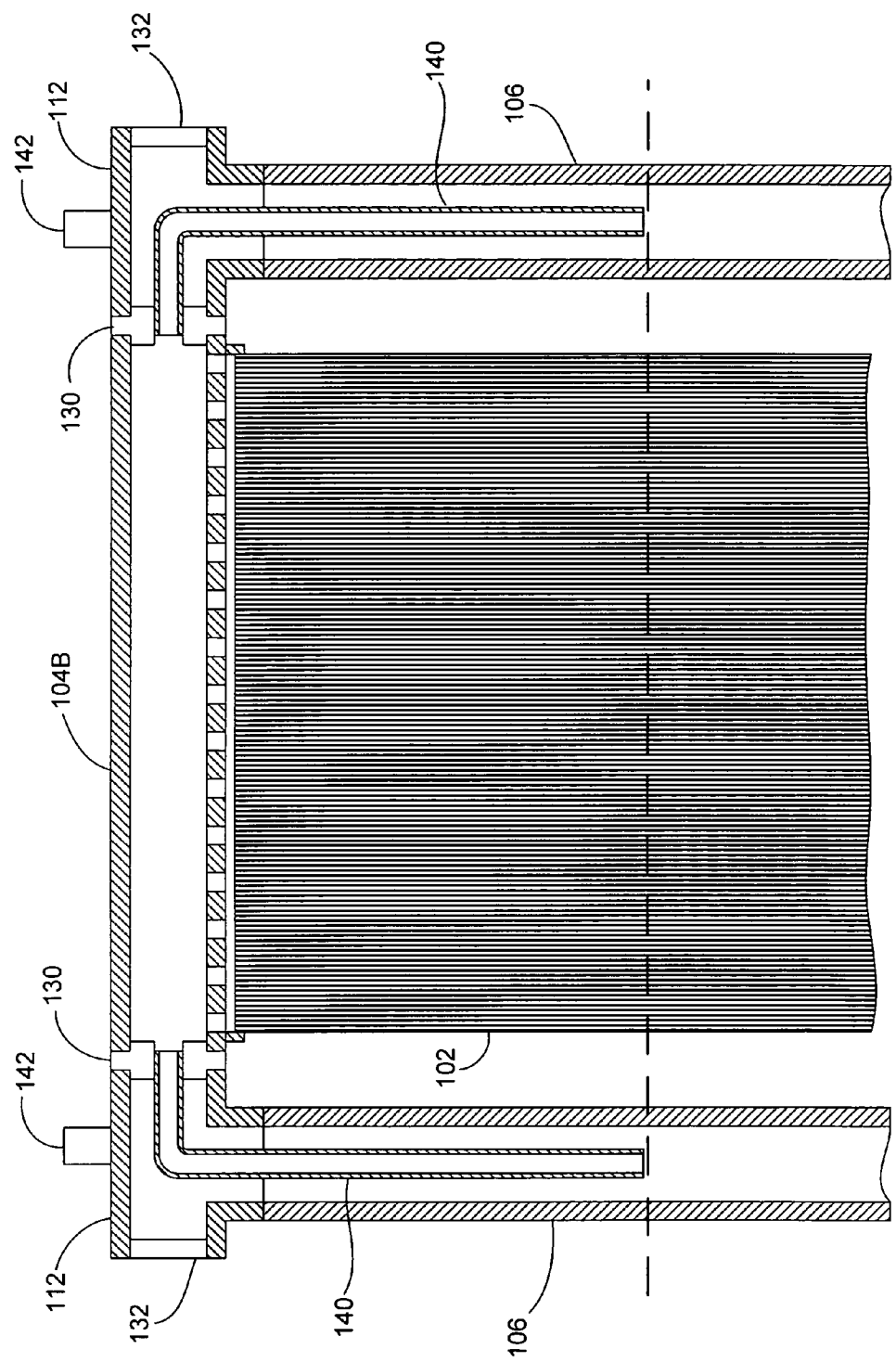
FIG. 17 is a partial front view, in cross section, of a solar heater including dip tubes, in accordance with one embodiment of the present invention.

FIG. 17 is a partial front view, in cross section, of the solar heater 100 including dip tubes 140 that fluidly couple the header 104B with the storage tanks 106. The dip tube 140 is a long slender tube that is disposed in the coupler 130 located between the T joints 112 and the header 104B and that extends into the storage tank 106. The dip tubes 140 are configured to pipe the heated water inside the header 104B down some distance inside the storage tanks 106. The dip tubes 140 may for example extend halfway into the storage tanks 106. The addition of dip tubes is believed to improve the performance of the system by limiting the mixing of hot and cold water inside the storage tanks 106 and preventing the release of the hottest water during reverse thermosiphoning (saves the hottest water for draws as for example in the morning when the thermal storage is at a minimum due to losses at night).

When hot water is released into the storage tank 106 via the dip tube 140, the hot water tends to stratify in the upper region of the storage tanks 106. In order for the hot water to be available for a draw, the top portion of the storage tanks 106 may include an outlet 142. In the illustrated embodiment, the T joints 112, which form a portion of the storage capacity, and which are located above the storage tanks 106, are each configured with outlets 142 where draws can be taken. In some cases, the outlets 142 are routed together before being delivering the hot water to the point of use or auxiliary tank, and in other cases, the outlets 142 each deliver the hot water separately. When there are no draws being taken, the system is capable of both forward and reverse thermosiphoning through the dip tube 142 depending on the current environmental conditions.

During forward thermosiphoning, the dip tube 140 directs hot liquid from the header 104B down to the middle of the storage tank 106 (dashed line). For example, as the heated water from the collector 102 enters the top header 104B, the previously heated water in the header 104B is pushed to the sides of the header 104B where it is forced into the storage tank 106 through the dip tubes 140. When deposited into the storage tank 106 (at the dashed line), the incoming hotter water tends to migrate to the upper portion of the storage tank 106 (above the dashed line) and the colder water already inside the storage tank 106 tends to migrate to the lower portion of the storage tank 106 (below the dashed line). That is, the hot water flowing out the dip tube 140 rises to the top of the storage tank 106 since it is lighter than the water currently in the storage tank 106, and the heavier cold water already inside the storage tank 106 falls to the bottom of the storage tank 106.

During reverse thermosiphoning, the dip tube 140 directs warm liquid from the middle of the storage tank 106 (dashed line) to the header 104B without affecting the hotter water in the upper region of the storage tank 106 (above the dashed line). The hotter water in the upper region of the storage tank 106 is therefore reserved for draws, and the warmer water in the middle to lower regions of the storage tank 106 is used for freeze protection. Without a dip tube 140, the hottest water in the upper region of the storage tank 106 would be released into the header rather than the warm water at the middle of the storage tank 106. As a result, the system would run out of hot water very quickly or only provide luke warm water when draws were being taken.

Figure 18:
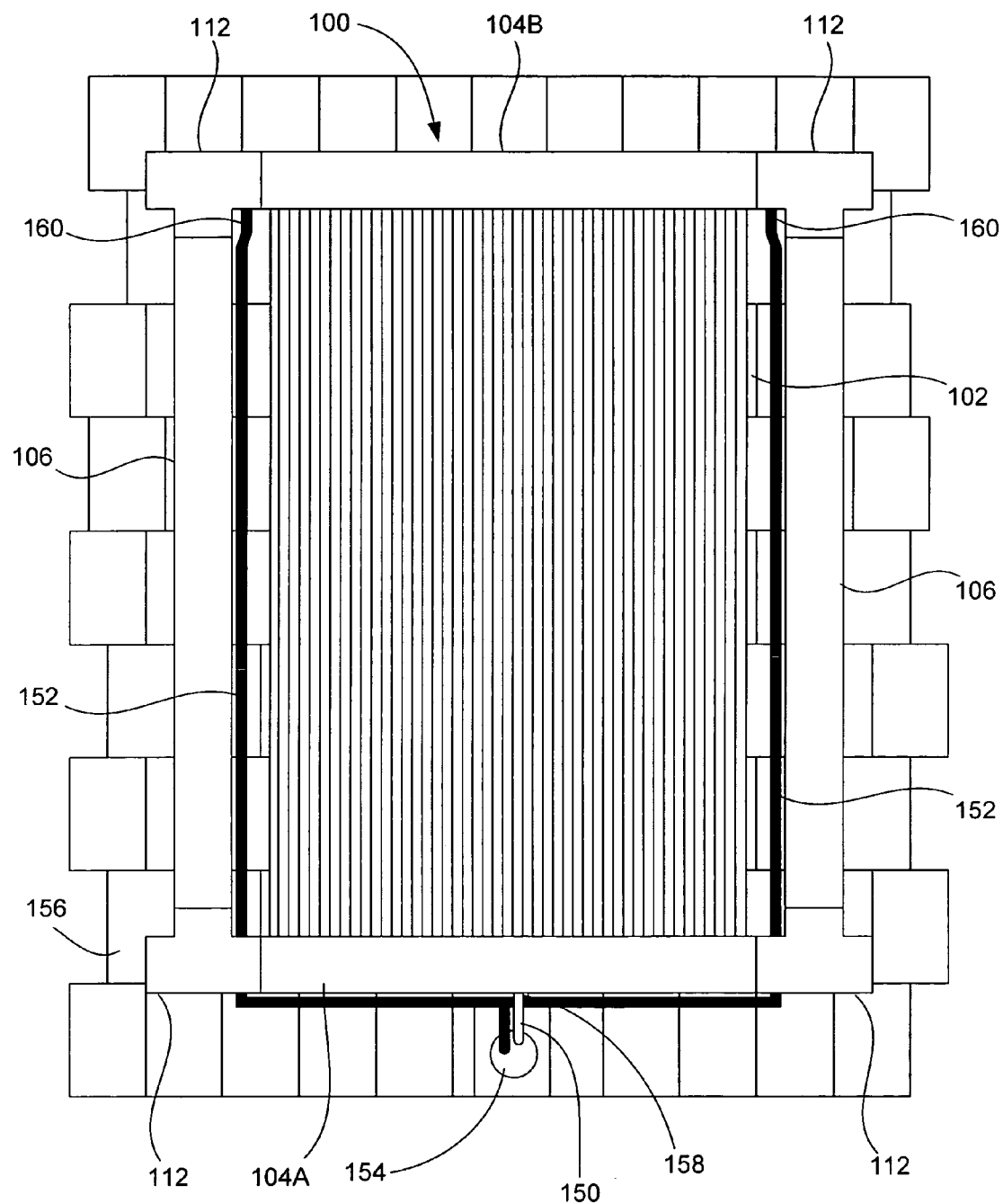
FIG. 18 is a front view of a solar heater that routes the cold and hot water pipes through the same roof penetration, in accordance with one embodiment of the present invention.

Referring to FIG. 18, the system 100 may be configured to route the cold inlet pipe 150 and the hot outlet pipes 152 through the same roof penetration 154 when the solar heater 100 is positioned on a roof 156. Roof penetrations are the points where the piping enters and exits the home. Conventionally, solar heaters have routed the hot water pipes and the cold water pipes through different roof penetrations, i.e., one for the hot water piping and one for the cold water piping. This, however, increases the possibility of roof leaks as well as increases costs and complexity associated with installing the solar heater on the roof (e.g., flashings, roofing materials, labor, etc.).

As such, the present invention proposes using a single roof penetration 154 for both the hot water piping and the cold water piping. In order to accomplish this, at least one set of pipes is routed differently than would have otherwise been done conventionally. The manner in which the piping is routed generally depends on the location of the roof penetration 154. By way of example, the cold water piping 150 may be routed to the roof penetration typically used only for the hot water piping (above the solar heater), the hot water piping may be routed to the roof penetration typically used only for the cold water piping (below the solar heater), or both sets of piping may be routed to a new location altogether.

Because there tends to be more piping when using one roof penetration, it is generally preferable to position the piping at locations that keep the piping hidden thereby maintaining a clean aesthetical appearance. In order to keep the piping substantially hidden, the piping (whether the cold inlet piping or the hot outlet piping) can be routed along the outer or inner edge of the storage tanks 106, the outer or inner edge of the headers 104, and/or the outer edge or underneath the collector 102 in order to get the piping to one location. In some cases, the piping may even be routed within an insulation member that surrounds the storage tanks 106 and/or the headers 104.

In the illustrated embodiment, the solar heater 100 includes a single inlet 158 at the center of the bottom header 104A and a pair of outlets 160 at the T joint 112 above the storage tanks 106. The single roof penetration 154 is located directly below the bottom header 104A proximate the cold water inlet 158. The cold water piping 150, which connects to the cold water inlet 158, is therefore easily routed through the roof penetration 154. The hot water piping 152, on the other hand, has to traverse a greater distance. The hot water piping 152 is routed from the hot water outlets 160 located near the edge of the upper header at the T joints 112 to the roof penetration 154 located below the center of the bottom header 104A. Although the outlets 160 can be placed at any point on the T joint 112, in the illustrated embodiment, the outlets 160 are placed in an inside bottom section of the T joint 112. By placing the outlets 160 here, most of the hot water piping 152 can be discriminately placed inside the footprint of the solar heater 100 thereby making it more aesthetically pleasing. More particularly, in order to keep the hot water piping 152 substantially hidden, the piping 152 may be routed down along the inner edge of the storage tanks 106 and across the inner edge of the header 104A. The dual hot water piping 152 can be separately placed within the roof penetration 154 or alternatively the dual hot water piping 152 may combined into a single pipe and thereafter placed within the roof penetration 154 (as shown).

In one embodiment, a multifunctional conduit that combines the supply piping, the return piping and the wires for thermistors or other electrical devices into a single integrated tube is used. By combining these components together, the components may be more easily routed from the solar heater to inside the home, i.e., provides a better way to manage the piping and wires especially when using a single roof penetration. The multifunctional conduit generally includes an outer flexible tube that encloses a flexible supply pipe, a flexible return pipe, and various electrical wires. The supply pipe may for example correspond to the cold water piping that connects the hot water heater to the cold water inlet, and the return pipe may for example correspond to the hot water piping that connects the hot water heater to the hot water outlet. The electrical wires, on the other hand, may represent sensing wires that couple the temperature sensors at the solar heater to the controller.

Figure 19:
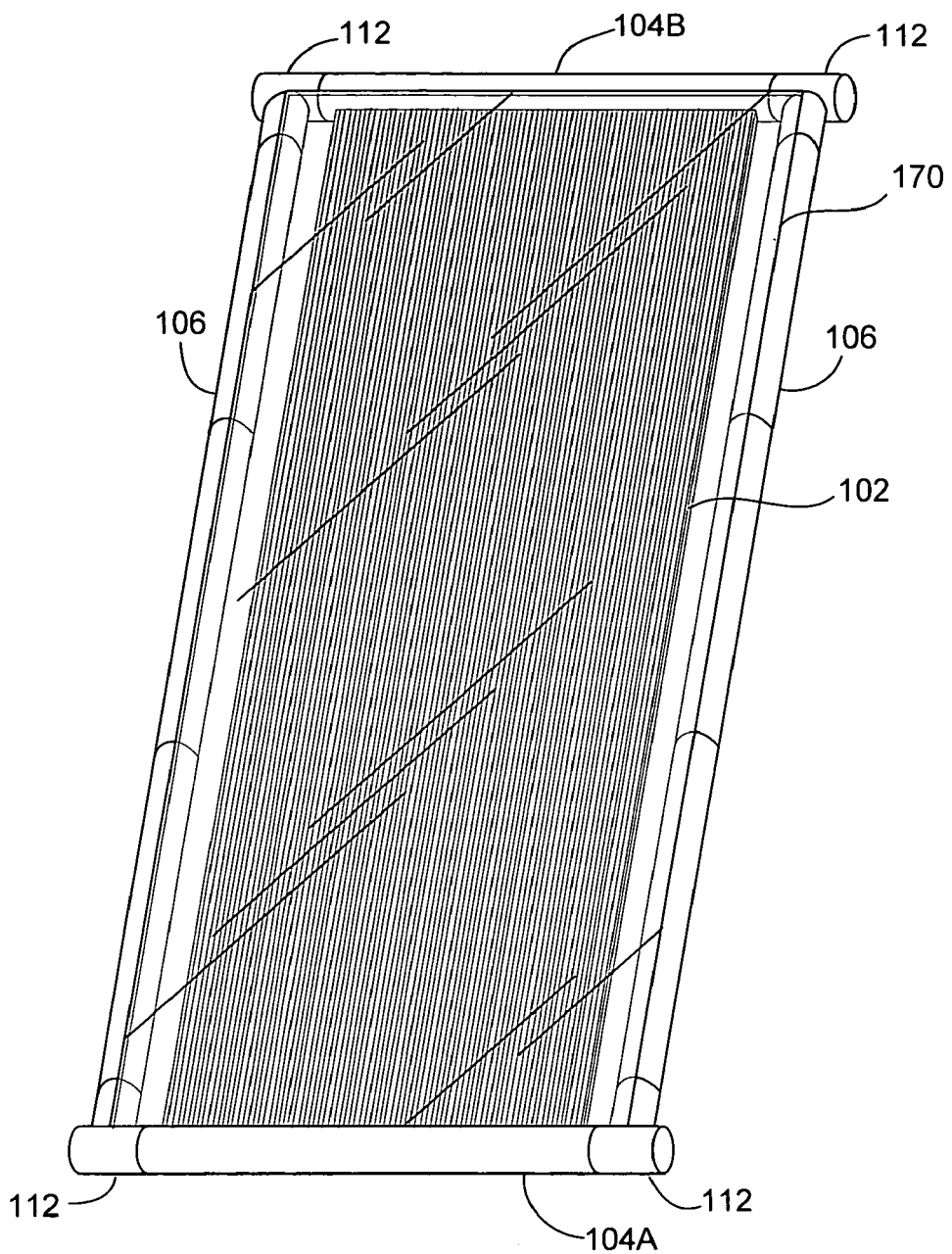
FIG. 19 is a perspective diagram of a solar heater including a transparent cover, in accordance with one embodiment of the present invention.
Figure 20:
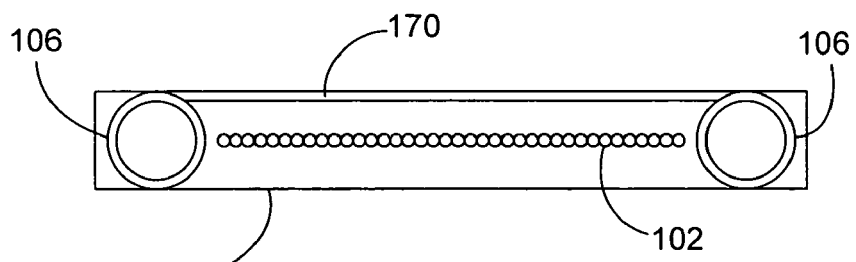
FIG. 20 is a side view, in cross section, of the solar heater shown in FIG. 19, in accordance with one embodiment of the present invention.

Referring to FIGS. 19 and 20, the system 100 may include a transparent cover 170 that allows the influx of solar energy into the collector area. The transparent cover 170 may for example include one or more transparent sheets or glazing layers that are laid over one another typically with an air gap disposed between each sheet and between the lowest sheet and the collector 102. The sheets may be formed from materials such as glass and clear plastic, although plastic is typically preferred over glass in order to make shipping and installation easier and cheaper. By way of example, the sheets may be formed from a plastic material such as polycarbonate. In some cases, the transparent covers are formed from channelized plastic sheets, i.e., sheets that include channels running therethrough.

As shown, the transparent cover 170 is positioned over the collector 102 and configured to rest on or be supported by the storage tanks 106 and/or the headers 104. That is, the storage tanks 106 and headers 104, which form the outer walls of the solar heater 100, may double as a platform for the various sheets of the transparent cover 170. By way of example, the transparent cover 170 may be placed on the upper surface of these components or alternatively at some portion below the top surface of these components (e.g., within the rounded area of the pipe). The transparent cover 170 may be secured directly to the storage tanks 106 and/or headers 104, or indirectly via insulation members that surround the storage tanks 106 and/or headers 104. By way of example, the transparent cover 170 may be glued, screwed, bolted, snapped, clipped, trapped, strapped or otherwise attached to the surrounding walls (e.g., storage tanks, headers, insulation).

In order to prevent damage to the thin walled plastic collector 102, the transparent cover 170 may be arranged in a way that helps the solar heater 100 manage high heats that can be generated by the transparent cover 170 (e.g., high heats generated by the transparent cover can harm the plastic collector). That is, the transparent cover 170 can be configured to limit the maximum collector temperature or prevent the collector 102 from reaching a predetermine temperature thereby ensuring the integrity of the plastic collector 102 (prevent the onset of creep). This may be referred to as stall protection. Stall protection can be implemented in a variety of ways. By way of example, stall protection may be implemented by allowing air to circulate under the transparent cover 170, using a sheet that is imperfect, using films that make the sheet imperfect, providing gaps or openings in the sheet sections in order to allow hot air to vent, selecting a non optimal gap between the sheets and the collector 102, and/or the like.

Although the transparent cover 170 is shown fully covering the solar heater 100, particularly the collector 102, it should be noted that in some cases the transparent cover 170 may only be placed over a portion of the collector 102 in order to provide stall protection. In cases such as these the transparent cover 170 may be formed as one piece that only covers a portion of the space between the headers 104A and 104B, or it may be made up of a plurality of pieces that cover different regions of this space at different levels above the collector surface. In either case, significant gaps are created that help reduce the temperature within the solar heater 100 (thereby protecting the plastic collector).

Referring to FIGS. 21 and 22, the system 100 may further include insulating members 180 that surround the storage tanks 106 and/or the headers 104. The insulating members 180 help the storage tanks 106 and headers 104 retain heat therein thereby reducing thermal losses. The insulating members 180 may be formed from a variety of materials including for example expanded polystyrene (EPS). In some cases, the insulating members 180 are preformed such that different insulation profiles can be made. The insulation profiles may effect the overall appearance of the solar heater 100 as well as to provide additional functionality. For example, since the insulating members 180 surround the outer walls of the solar heater 100, the insulating members 180 can be used to enhance the overall shape or contour of the solar heater 100. Furthermore, they may include features for supporting various components including for example the transparent cover 170 and for routing piping and wiring around the solar heater 100 thereby keeping them protected and hidden from view.

The insulating members 180 may be formed as one or more pieces and typically includes an opening 182 for receiving the storage tanks 106 and headers 104. When a single piece, the storage tanks 106 and headers 104 can be slid into the insulation members 180 through the opening 182. Alternatively, the single piece may include a slit 184 that allows the upper half 186 and lower half 188 of the insulating member 180 to be flexed away from one another so that the storage tanks 106 and headers 104 can easily be placed inside the opening 182. This is generally required for the header because of the collector, i.e., the slit provides access between the header and collector. When multiple pieces, the insulating members 180 are typically embodied as upper and lower section that are brought into position around the component (e.g., sandwiched). Although not a requirement, the insulating members 180 may be secured around the storage tanks 106 and headers 104 via an adhesive such as tape. Tape may for example be used to encircle the insulating members 180 thereby securing the halves around the storage tanks 106 and headers 104.

The insulating members 180 may additionally include a preformed portion for receiving the transparent cover 170. As shown in FIG. 21, a recess 190 is placed in the top surface 192 of the insulating members 180 around the inner perimeter of the insulating members 180. As shown in FIG. 22, a channel 196 is placed in the inner side surface 198 around the inner perimeter of the insulating members 180. In both cases, the preformed recess or channel provide a platform for positioning and securing the transparent cover 170 to the insulation members 180. In some cases, the transparent cover 170 is further glued, taped, or fastened to the insulation members 180 in order to hold it in place relative to the insulating members 180.

Figure 23:
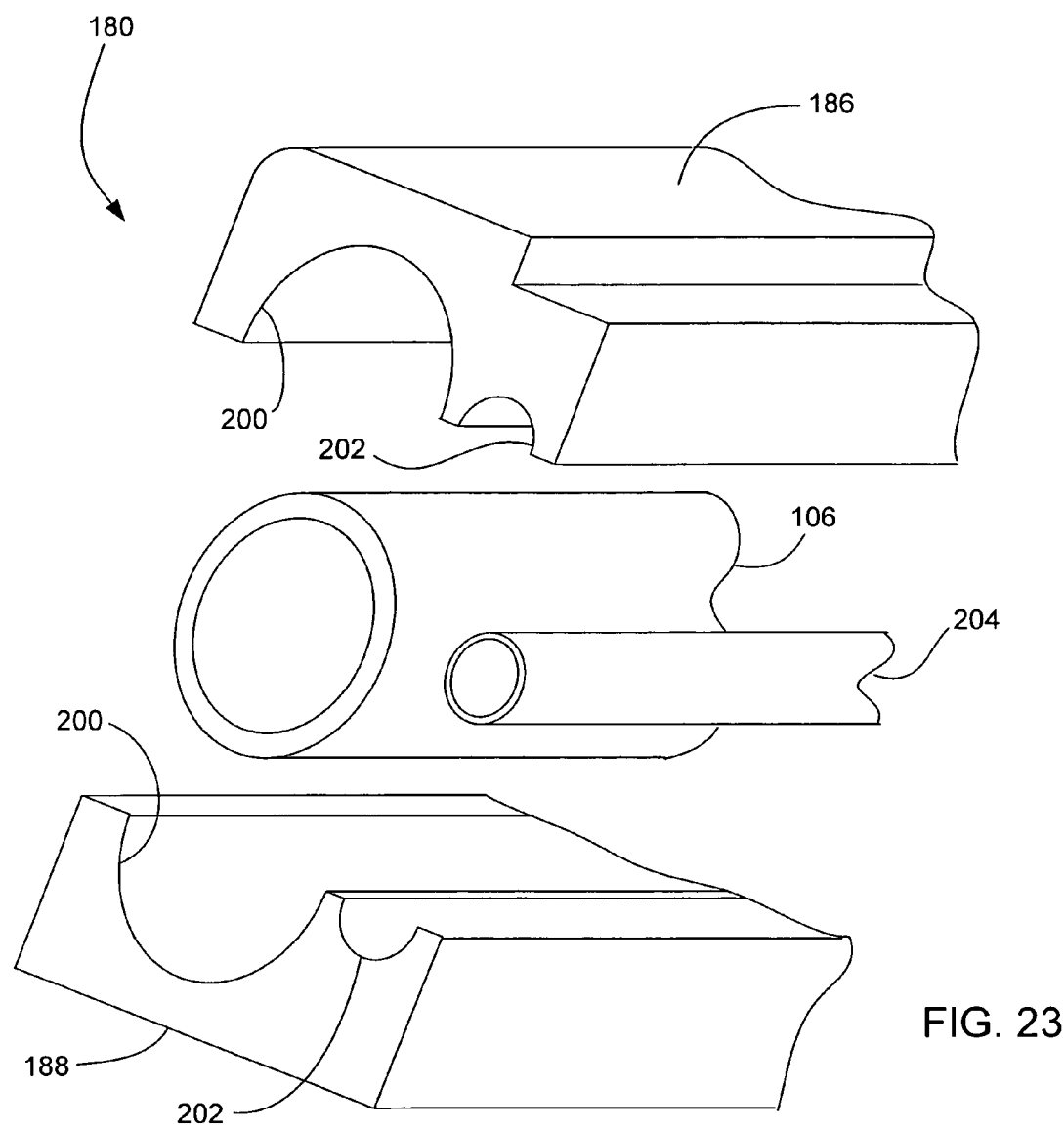
FIG. 23 is a partial perspective view of an insulating member, in accordance with one embodiment of the present invention.

Referring to FIG. 23, the insulating member 180 may be divided into two sections, an upper section 186 and a lower section 188. Each of the sections includes a first preformed void 200 and a second preformed void 202. When the two sections 186 and 188 are sandwiched together, the first voids 200 cooperate to form an opening for receiving a storage tank 106 or header 104 and the second voids 202 cooperate to form an opening for receiving a pipe 204. This particular embodiment is useful in cases where piping is routed along the sides of the storage tank 106 or header 104. The opening created by the second voids 202 keeps the piping insulated as well as hidden from view. This is particularly advantageous in cases where the hot water piping is routed from the top of the solar heater to the bottom of the solar heater as for example when a single roof penetration is used (see FIG. 18).

Figure 24:
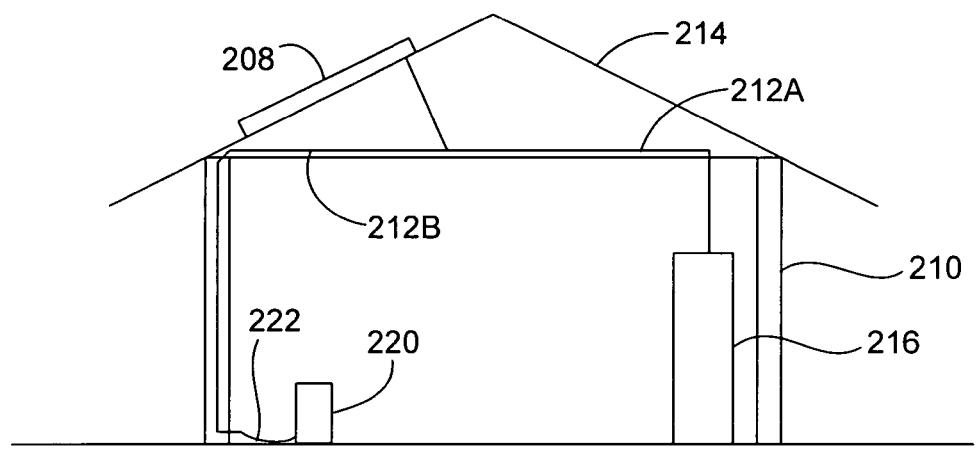
FIG. 24 is a simplified diagram of a solar heater that is positioned on a home, in accordance with one embodiment of the present invention.

FIG. 24 is a simplified diagram of a solar water heater 208 that is positioned on a home 210, in accordance with one embodiment of the present invention. The solar water heater 208 may for example correspond to any of those previously described or shown. The solar water heater 208 is capable of providing heated fluid that can be used for space heating and/or domestic hot water (potable water). In the case of domestic hot water, the hot water piping 212A is typically piped through the roof 214 into a hot water heater 216 located within the home 210. From there the hot water is distributed to different parts of the home 210 as for example the kitchen, bathrooms, etc.

In the case of space heating, the hot water piping 212B is typically piped through the roof 214 and through the walls to the area desired for space heating. Space heating may be provided by permanent heating elements as for example tubes positioned underneath the flooring, or furnaces positioned inside rooms of the home 210. Space heating may also be provided by a portable furnace 220, which can be transported to different rooms inside the home 210. The portable furnace 220 allows heating to take place in distinct locales rather than over the entire home 210. The user simply rolls the portable furnace 220 into the desired room and plugs it into a fitting that is coupled to the hot water piping 212B. The fitting may for example be placed on the wall or floor similarly to electrical outlets. The portable furnace 220 typically includes a tube 222 extending therefrom, which plugs into the outlet on the wall. The tube 222 may be synonymous with an electric cord. The tube 222 connects to the fitting and allows the hot water to be transported from the fitting to the portable furnace 220. The portable furnace 220 may include heating coils, and further a fan for blowing warm air created by the coils.

Figure 25:
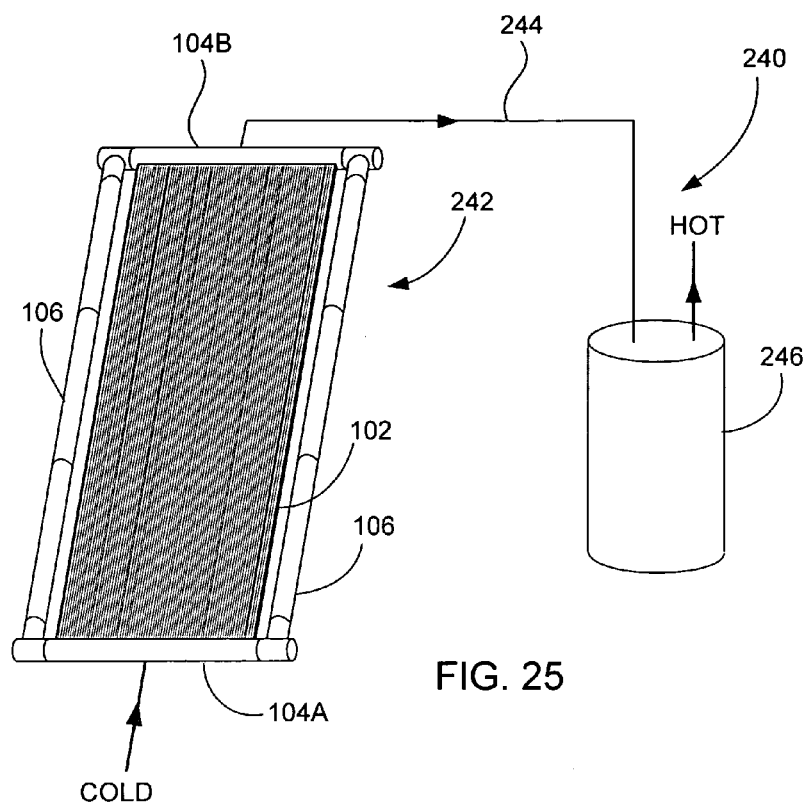
FIG. 25 is a diagram of a passive solar system, in accordance with one embodiment of the present invention.

FIG. 25 is a diagram of a passive solar system 240, in accordance with one embodiment of the present invention. The passive solar system 240 includes a solar heater 242, which may correspond to any of those previously described or shown. In the Figure, the solar heater 242 is represented by the solar heater of FIG. 10. As shown, cold water is delivered to cold water inlet located in the bottom header 104A of the solar heater 100. The cold water may be delivered from a city water source or a well. When a tap is opened inside the home, the pressure of the incoming water forces the hot water located in the upper regions of the storage tank 106 and header 104B to exit out the hot water inlet located in the top header 104B. Once released from the hot water outlet, the hot water enters hot water piping 244 that delivers the hot water to a hot water heater 246. From there, the hot water is piped out of the hot water heater 246 to the opened tap.

Although the solar heaters described herein are typically used in passive systems, it should be noted that they are not limited to only passive systems. The system in fact can be configured as an active system. This presents a paradigm shift in the way that systems are normally used. Solar heaters are typically dedicated to either a passive system or an active system, and typically cannot be configured for both without major adjustments to the system. In contrast, this system can be applied to either system with minimal modification thereto. That is, the solar heater can be used passively or it can be plugged into an active system.

Figure 26:
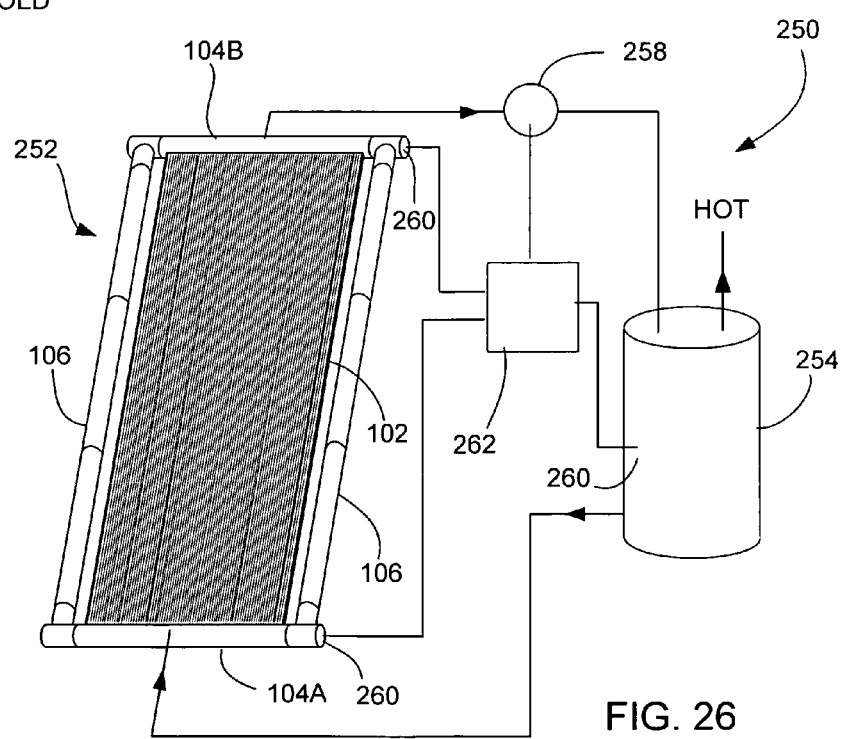
FIG. 26 is a diagram of an active solar system, in accordance with one embodiment of the present invention.

FIG. 26 is a diagram of an active solar system 250, in accordance with one embodiment of the present invention. The active solar system includes a solar heater 252, which may correspond to any of those previously described or shown. In the Figure, the solar heater 252 is represented by the solar heater of FIG. 10. The active system 250 further includes a hot water heater 254 and a water flow control system 256. The water flow control system 256 includes at least one pump 258, various temperature sensors 260 and a controller 262. The pump 258 is configured to pump hot water from the solar heater 252 to the hot water heater 254 and to pump cold water from the hot water heater 254 to the solar heater 100. The temperature sensors 260 are configured to measure the temperature of water at various points in the system 250. The temperature sensors may for example be placed at the solar heater inlet, at various points in the hot water heater or at the outlet of the solar heater. The controller 262 is operatively coupled to the pumps 258 and the sensors 260. The controller 262 receives temperature signals from the sensors 260, and determines when the pump 258 should be activated in order to move water through the system 250.

Figure 27A:
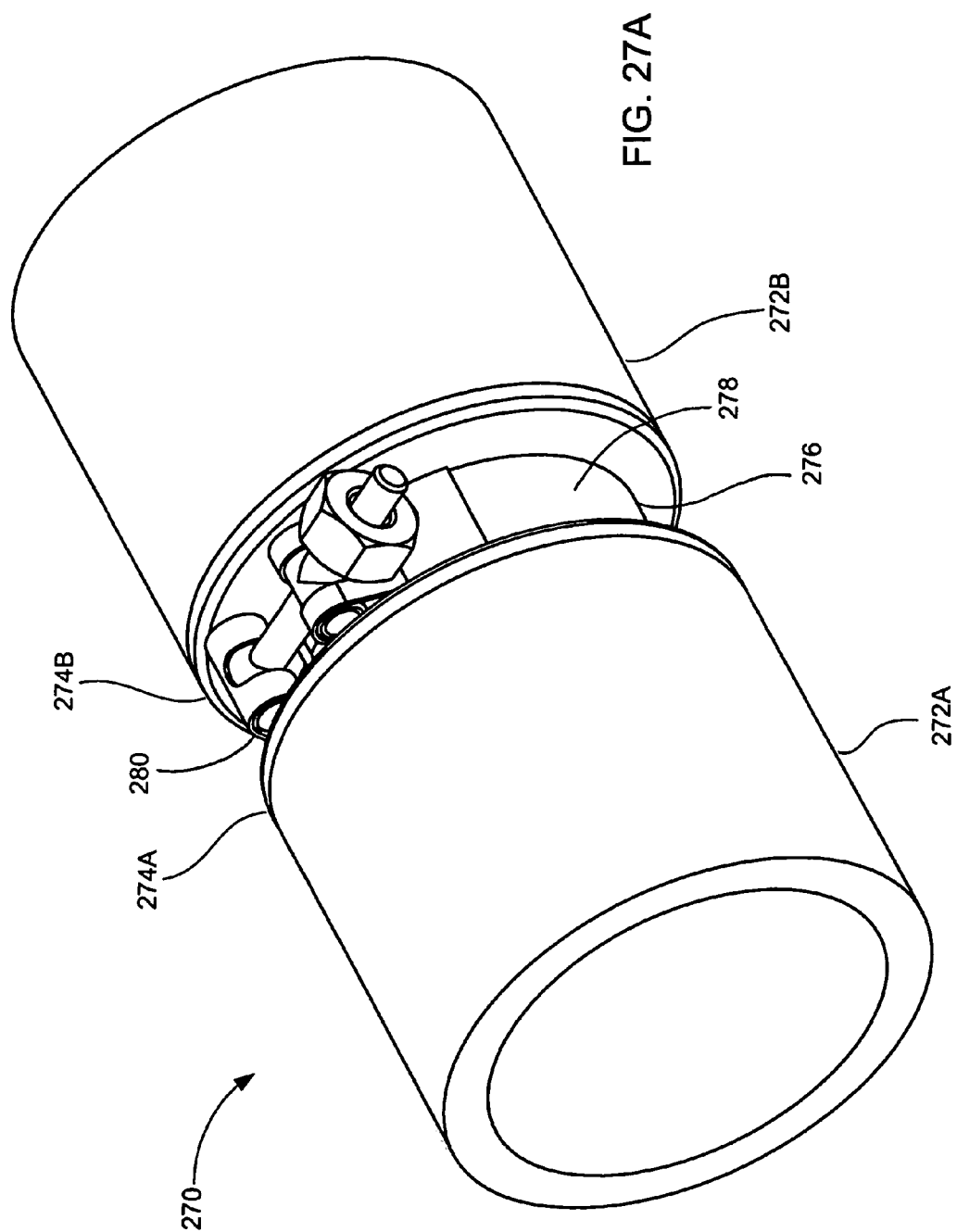
FIG. 27A is a perspective view of a coupler arrangement, in accordance with one embodiment of the present invention.

FIGS. 27A and 27B are diagrams of a coupler arrangement 270, in accordance with one embodiment of the present invention. The coupler arrangement 270 is configured to connect the ends of two pipe members 272A and 272B. The coupler arrangement 270 may for example correspond to the couplers used to connect the storage tanks, joints, headers, etc., of FIGS. 11-15.

As shown in FIG. 27A, the coupler arrangement 270 structurally holds the pipe members 272 together thereby forming a unified piece. The coupler arrangement 270 includes a first coupling member 274A and a second coupling member 274B. The first coupling member 274A is attached to the first pipe member 272A and the second coupling member 274B is attached to the second pipe member 272B. The coupling members 274 may be attached to their respective pipe members 272 using any suitable technique including for example threads, glues or welds. This may be accomplished during manufacturing or during assembly. Alternatively, the coupling members 274 and pipe members 272 may be integrally formed with one another. For example, they coupling members 274 may be molded with the pipe members 272.

The coupler arrangement 270 also includes a clamp 276 that secures the first coupling member 274A to the second coupling member 274B. The clamp 276 typically includes a band 278 and clamping mechanism 280 that allows the band 278 to be placed over the coupling members 274 and thereafter tightened radially inwardly around the two coupling members 274. The clamping mechanism 280 may be widely varied. In the illustrated embodiment, the clamping mechanism 280 includes a nut 282 that when rotated either tightens or loosens the bands 278. The nut 282 may for example be rotated via a wrench. As should be appreciated, this particular arrangement allows the two pipe members 272A and 272B to be attached to one another (or detached from one another) with simplicity, ease and minimal effort.

As shown in FIG. 27B, the coupling arrangement 270 places the first and second pipe members 272A and 272B in fluid communication with one another. The coupling members 274 include a back end that is inserted into and attached to the end of the pipe member 272, and a front end that interfaces with the other coupling member 274. The front end of each coupling member 274 includes a flange 284 that is captured by a recess 286 in the band 278 of the clamp 276. When the clamping mechanism 280 is tightened, the band 278 and more particularly the recess 286 moves inwardly around the flanges 284 thereby sandwiching the two flanges 284A and 284B together. The front faces 286 of the coupling members 274 are forced into sealed engagement thereby allowing fluids to flow through the fluid passages 288 of the coupling members 274 and between the pipe members 272 without leaks. In some cases, an o-ring 290 may be placed between the faces 286 of the coupling members 274 to further seal the interface. In the illustrated embodiment, at least one of the coupling members 274 includes a recess 292 in its face for receiving the o-ring 290.

While this invention has been described in terms of several preferred embodiments, there are alterations, permutations, and equivalents, which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A solar heater, comprising:

a substantially planar collector including a plurality of heat exchanger channels that are positioned next to one another in a parallel relationship;

a pair of headers, each header having a diameter that is substantially larger than the diameters of the heat exchanger channels of the collector, a first one of the headers being fluidly coupled and rigidly joined to a top end of the collector, a second one of the headers being fluidly coupled and rigidly joined to a bottom end of the collector such that the pair of headers are substantially coplanar with the collector; and at least one storage tank that has a diameter that is substantially larger than the diameters of the heat exchanger channels of the collector, the at least one storage tank being fluidly coupled and rigidly joined to each of the headers and extending between the headers such that the at least one storage tank is substantially coplanar with the collector and the pair of headers and such that the pair of headers and the at least one storage tank form a rigid frame for supporting the collector, and wherein the solar heater is configured such that when the solar heater is operated in a first operating mode a working fluid follows a circulation path that sequentially flows (i) through the heat exchanger channels from the bottom end of the collector upwards to the top end of the collector and into the first header, (ii) through the first header to the top end of the at least one storage tank, (iii) from the top end of the at least one storage tank to the bottom end of the at least one storage tank and into the second header, and (iv) through the second header back into the heat exchanger channels at the bottom end of the collector.

2. The solar heater as recited in claim 1 wherein the channels are formed from immediately adjacent plastic tubes.

3. The solar heater as recited in claim 1 wherein the collector is flexible and wherein the headers and at least one storage tank are rigid.

4. The solar heater as recited in claim 1 wherein the headers and at least one storage tank are formed from plastic pipe and wherein the heat exchanger channels are formed from plastic tubes.

5. The solar heater as recited in claim 1 wherein the collector is formed from individual plastic tubes that are flexible and held together with one or more clips, and wherein the headers and at least one storage tank are formed from round plastic pipes that are rigid.

6. A solar heater, comprising:
a substantially planar collector including a plurality of heat exchanger channels that are positioned next to one another in a parallel relationship;
a pair of headers, each header having a diameter that is substantially larger than the diameters of the heat exchanger channels of the collector, a first one of the headers being fluidly coupled and rigidly joined to a top end of the collector, a second one of the headers being fluidly coupled and rigidly joined to a bottom end of the collector such that the pair of headers are substantially coplanar with the collector; and
at least one storage tank that has a diameter that is substantially larger than the diameters of the heat exchanger channels of the collector, the at least one storage tank being fluidly coupled and rigidly joined to each of the headers and extending between the headers such that the at least one storage tank is substantially coplanar with the collector and the pair of headers and such that the pair of headers and the at least one storage tank form a rigid frame for supporting the collector, and wherein the solar heater is capable of both forward and reverse thermosiphoning
wherein the solar heater is configured such that when the solar heater is operated in the forward thermosiphoning mode a working fluid follows a circulation path that sequentially flows (i) through the heat exchanger channels from the bottom end of the collector upwards to the top end of the collector and into the first header, (ii) through the first header to the top end of the at least one storage tank, (iii) from the top end of the at least one storage tank to the bottom end of the at least one storage tank and into the second header, and (iv) through the second header back into the heat exchanger channels at the bottom end of the collector.

7. The solar heater as recited in claim 1 wherein the headers and the at least one storage tank provide a rigid frame for the solar heater.

8. The solar heater as recited in claim 1 wherein the collector, headers and at least one storage tank are modular components that allow for the customization of the solar heater.

9. The solar heater as recited in claim 1 wherein the at least one storage tank includes a plurality of storage segments that combine to form the storage tank.

10. A solar heater, comprising:
a substantially planar collector including a plurality of heat exchanger channels that are positioned next to one another in a parallel relationship;
a pair of headers, each header having a diameter that is substantially larger than the diameters of the heat exchanger channels of the collector, a first one of the headers being fluidly coupled and rigidly joined to a top end of the collector, a second one of the headers being fluidly coupled and rigidly joined to a bottom end of the collector such that the pair of headers are substantially coplanar with the collector; and
at least one storage tank that has a diameter that is substantially larger than the diameters of the heat exchanger channels of the collector, the at least one storage tank being fluidly coupled and rigidly joined to each of the headers and extending between the headers such that the at least one storage tank is substantially coplanar with the collector and the pair of headers and such that the pair of headers and the at least one storage tank form a rigid frame for supporting the collector, wherein the headers and at least one storage tank each have an outside diameter in the range of approximately 3.5 inches to 6 inches, and wherein the heat exchanger channels of the collector each have a diameter in the range of approximately ⅛ inches and about ¼ inches.

11. The solar heater as recited in claim 1 wherein the solar heater is configurable.

12. The solar heater as recited in claim 1 wherein the solar heater is collapsible.

13. A thermosiphoning solar heater, comprising:
a flexible collector including a plurality of plastic tubes that are positioned side by side to form a planar arrangement of the plastic tubes;
a pair of rigid headers formed from plastic pipe, each header having a diameter that is substantially larger than the diameters of the plastic tubes of the collector, the headers being fluidly coupled and rigidly joined to the planar arrangement of plastic tubes of the collector, a first one of the headers being substantially perpendicularly positioned at a top end of the collector and a second one of the headers being substantially perpendicularly positioned at a bottom end of the collector such that the pair of headers are substantially coplanar with the arrangement of plastic tubes of the collector; and
at least a first pair of rigid storage tanks formed from plastic pipe, each storage tank having a diameter that is substantially larger than each of the diameters of the plastic tubes of the collector, each storage tank being fluidly coupled and rigidly joined to the pair of headers, the storage tanks being positioned next to and parallel with the collector, a first one of the storage tanks being positioned on a first side of the collector and a second one of the storage tanks being positioned on a second side of the collector, wherein top ends of the first and second storage tanks are fluidly coupled and rigidly joined to the first header and bottom ends of the first and second storage tanks are fluidly coupled and rigidly joined to the second header such that the first and second storage tanks are substantially coplanar with the arrangement of plastic tubes of the collector and the headers and such that the pair of headers and the first pair of storage tanks form a rigid frame for supporting the collector, and wherein the solar heater is configured such that when the solar heater is operated in a thermosiphoning mode a working fluid follows a circulation path that sequentially flows (i) through the heat exchanger channels from the bottom end of the collector upwards to the top end of the collector and into the first header, (ii) through the first header to the top end of the at least one storage tank, (iii) from the top end of the at least one storage tank to the bottom end of the at least one storage tank and into the second header, and (iv) through the second header back into the heat exchanger channels at the bottom end of the collector.

14. The thermosiphoning solar heater as recited in claim 13 wherein the length of the storage tanks define the height of the solar heater, and wherein the length of the headers define width of the solar heater, and wherein the height of the solar heater is greater than the width of the solar heater.

15. The thermosiphoning solar heater as recited in claim 13 wherein the storage tanks include a plurality of storage segments that couple together to form the storage tank.

16. The thermosiphoning solar heater as recited in claim 15 wherein the storage segments are connected to one another via couplers.

17. The thermosiphoning solar heater as recited in claim 13 further including a joint disposed between the ends of the headers and the ends of the storage tanks, the joint fluidly coupling the storage tanks to the headers.

18. The thermosiphoning solar heater as recited in claim 17 wherein the joint is a T joint.

19. The thermosiphoning solar heater as recited in claim 17 wherein the joint is connected to the storage tanks and headers via couplers.

20. The thermosiphoning solar heater as recited in claim 17 wherein the top header is fluidly coupled to the storage tanks via dip tubes, the dip tubes being configured to pipe heated water from the top header to a middle section of the storage tanks.

21. The thermosiphoning solar heater as recited in claim 17 further including inlet and outlet piping, the inlet piping coupling to the bottom header, the outlet piping coupling to the top header, and wherein the inlet and outlet piping are piped through the same roof penetration.

22. The thermosiphoning solar heater as recited in claim 17 further including a transparent cover positioned over the collector and being supported at least by the storage tanks.

23. The thermosiphoning solar heater as recited in claim 22 wherein the transparent cover is configured to prevent the collector from reaching a predetermined temperature.

24. The thermosiphoning solar heater as recited in claim 13 further including preformed insulating members that surround the storage tanks and headers.

25. The thermosiphoning solar heater as recited in claim 24 wherein the insulating members include a recess or channel for receiving a transparent cover that is positioned over the collector.

26. The thermosiphoning solar heater as recited in claim 13 wherein the solar heater is capable of being disposed in a passive or active solar system without substantial modification.

27. The thermosiphoning solar heater as recited in claim 13 wherein the components of the solar heater are formed from polymers.

28. The thermosiphoning solar heater as recited in claim 27 wherein the components of the solar heater are formed from polyolefin's.

29. The thermosiphoning solar heater as recited in claim 13 wherein the components of the solar heater are formed from a family of plastic materials consisting essentially of polybutylene, polyethylene, polypropylene or polypropylene random copolymer.

30. The thermosiphoning solar heater as recited in claim 13 wherein the components of the solar heater are formed from polypropylene random copolymer (PPR).

31. The thermosiphoning solar heater as recited in claim 13 wherein the headers and storage tanks have an outside diameter of between about 3.5 inches and about 6 inches, and wherein the tubes of the collector have a diameter of between about 1/8 inches and about 1/4 inches.

* * * * *